(12) United States Patent
Kondo et al.

(10) Patent No.: US 6,438,267 B1
(45) Date of Patent: Aug. 20, 2002

(54) IMAGE COMPRESSION METHOD

(75) Inventors: Tetsujiro Kondo; Naoki Kobayashi, both of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/213,460

(22) Filed: Dec. 17, 1998

(30) Foreign Application Priority Data

Dec. 19, 1997 (JP) .......................................... P09-350425

(51) Int. Cl.[7] .................................................. G06K 9/36
(52) U.S. Cl. ....................................... 382/252; 382/238
(58) Field of Search ................................. 382/252, 238, 382/239; 318/261.2, 430, 463

(56) References Cited

U.S. PATENT DOCUMENTS

| | | | |
|---|---|---|---|
| 4,703,352 A | 10/1987 | Kondo | 358/135 |
| 5,122,873 A | 6/1992 | Golin | 358/133 |
| 5,193,003 A | 3/1993 | Kondo | 358/135 |
| 5,200,962 A | 4/1993 | Kao et al. | 371/41 |
| 5,293,230 A | 3/1994 | Golin | 348/410 |
| 5,331,414 A | 7/1994 | Golin | 348/390 |
| 5,349,385 A | 9/1994 | Glenn | 348/458 |
| 5,384,869 A | 1/1995 | Wilkinson et al. | 382/56 |
| 5,469,216 A | 11/1995 | Takahashi et al. | 348/441 |
| 5,488,618 A | 1/1996 | Kondo et al. | 371/67.1 |
| 5,495,297 A | 2/1996 | Fujimori et al. | 348/590 |
| 5,504,535 A | 4/1996 | Abe | 348/565 |
| 5,517,245 A | 5/1996 | Kondo et al. | 348/392 |
| 5,528,606 A | 6/1996 | Kondo et al. | 371/37.4 |
| 5,553,160 A | 9/1996 | Dawson | 382/166 |
| 5,598,214 A | 1/1997 | Kondo et al. | 348/414 |
| 5,610,658 A | 3/1997 | Uchida et al. | 348/416 |
| 5,625,712 A | 4/1997 | Schoenzeit et al. | 382/232 |
| 5,663,764 A | 9/1997 | Kondo et al. | 348/414 |
| 5,666,164 A | 9/1997 | Kondo et al. | 348/441 |
| 5,680,225 A | 10/1997 | Hirabayashi et al. | 358/451 |

(List continued on next page.)

FOREIGN PATENT DOCUMENTS

| | | | |
|---|---|---|---|
| EP | 0293041 A1 | 11/1988 | H04N/7/13 |
| EP | 0635978 A1 | 1/1995 | H04N/7/01 |
| JP | 3-53778 | 3/1991 | H04N/7/13 |
| WO | WO 91/20159 | 12/1991 | H04N/7/13 |
| WO | WO 92/07445 | 4/1992 | H04N/7/13 |
| WO | WO 93/13624 | 7/1993 | H04N/7/13 |

OTHER PUBLICATIONS

Patent Abstracts of Japan, JP 7-147681, Published Jun. 6, 1995, Sony Corporation.

I. Chang Et Al., "Adaptive Subsampling JPEG Image Coding," IEEE Jun. 1995, pp 264-265.

Application No. 08/893,134, Jul. 15, 1997.
Application No. 08/892,570, Jul. 15, 1997.
Application No. 08/893,022, Jul. 15, 1997.
Application No. 08/893,216, Jul. 15, 1997
Application No. 08/893,202, Jul. 15, 1997.

*Primary Examiner*—Jerome Grant, II
(74) *Attorney, Agent, or Firm*—Bell, Boyd & Lloyd LLC

(57) ABSTRACT

Quickly adjusting pixel values of a compressed image obtained by subsampling an original image provides a decoded image having high image quality. A compression section compresses an original image into compressed data by reducing the number of pixels of the original image. In a local decoding section, class classification is performed on the basis of the compressed data so that the original image is predicted in accordance with the resultant class and the prediction values are determined. Furthermore, in an error computation section, the prediction error of the prediction values with respect to the original image is computed. Then, in the compression section, an error curve expressing the relationship between the compressed data and the prediction error is estimated, the compressed data which minimizes the error curve is determined, and compressed data is output as the coded result of the original image.

25 Claims, 22 Drawing Sheets

U.S. PATENT DOCUMENTS

| | | | |
|---|---|---|---|
| 5,687,257 A | 11/1997 | Paik et al. | 382/239 |
| 5,734,433 A | 3/1998 | Kondo et al. | 348/421 |
| 5,739,873 A | 4/1998 | Kondo | 348/720 |
| 5,754,702 A | 5/1998 | Simpson | 382/240 |
| 5,796,442 A | 8/1998 | Gove et al. | 348/556 |
| 5,812,699 A | 9/1998 | Zhu et al. | 382/232 |
| 5,825,313 A | 10/1998 | Kondo et al. | 341/67 |
| 5,867,593 A | 2/1999 | Fukuda et al. | 382/176 |
| 5,870,434 A | 2/1999 | Kondo et al. | 375/242 |
| 5,880,784 A | 3/1999 | Lillevold | 348/404 |
| 5,912,708 A | 6/1999 | Kondo et al. | 348/415 |
| 5,930,394 A | 7/1999 | Kondo et al. | 382/232 |
| 5,960,116 A | 9/1999 | Kajiwara | 382/238 |
| 5,966,179 A | 10/1999 | Kondo et al. | 348/408 |
| 5,969,764 A | 10/1999 | Sun et al. | 348/404 |
| 6,016,164 A | 1/2000 | Kawaguchi et al. | 348/424 |
| 6,233,358 B1 * | 5/2001 | Acharya | 382/248 |

\* cited by examiner

IMAGE COMPRESSION METHOD

CROSS REFERENCE TO RELATED APPLICATIONS AND PATENTS

This application is related to: U.S. patent application Ser. No. 08/893,202, filed Jul. 15, 1997, entitled "IMAGE CODING APPARATUS, IMAGE CODING METHOD, IMAGE DECODING METHOD, IMAGE DECODING APPARATUS, IMAGE DATA TRANSMITTING METHOD AND RECORDING MEDIUM" by Tetsujiro Kondo; U.S. patent application Ser. No. 08/893,134, filed Jul. 15, 1997, entitled "IMAGE CODING AND DECODING USING MAPPING COEFFICIENTS CORRESPONDING TO CLASS INFORMATION OF PIXEL BLOCKS" by Tetsujiro Kondo; U.S. patent application Ser. No. 08/893,216, filed Jul. 15, 1997, entitled "IMAGE CODING APPARATUS, IMAGE CODING METHOD, IMAGE DECODING METHOD, IMAGE DECODING APPARATUS, IMAGE DATA TRANSMITTING METHOD AND RECORDING MEDIUM" by Tetsujiro Kondo; U.S. patent application Ser. No. 08/892,570, filed Jul. 15, 1997, entitled "IMAGE CODING AND DECODING USING MAPPING COEFFICIENTS CORRESPONDING TO CLASS INFORMATION OF PIXEL BLOCKS" by Tetsujiro Kondo; U.S. patent application Ser. No. 08/893,022, filed Jul. 15, 1997, entitled "IMAGE CODING AND DECODING USING MAPPING COEFFICIENTS CORRESPONDING TO CLASS INFORMATION OF PIXEL BLOCKS" by Tetsujiro Kondo. All the aforementioned applications have been assigned to the assignee of the present invention, and said applications are incorporated herein by reference.

In addition, this application is related to: U.S. Pat. No. 5,193,003, issued Mar. 9, 1993, entitled "APPARATUS FOR DECODING DIGITAL VIDEO DATA WITH SMALL MEMORY REQUIREMENT" by Tetsujiro Kondo; and U.S. Pat. No. 4,703,352, issued Oct. 27, 1987, entitled "HIGH EFFICIENCY TECHNIQUE FOR CODING A DIGITAL VIDEO SIGNAL" by Tetsujiro Kondo. All the aforementioned patents have been assigned to the assignee of the present invention, and said patents are incorporated herein by reference.

BACKGROUND OF THE INVENTION

1. Field of the Invention

The present invention relates to an image coding apparatus and image coding method, a recording medium, an image decoding apparatus, an image decoding method, a learning apparatus, and a learning method. More particularly, the present invention relates to an image coding apparatus for coding an image by, for example, subsampling it so that a decoded image which is almost the same as the original image can be obtained, and an image coding method, a recording medium, an image decoding apparatus, an image decoding method, a learning apparatus, and a learning method.

2. Description of the Related Art

Various methods have been put forward as methods for coding an image. For example, one such method is a method for compressing and coding an image by subsampling the pixels thereof.

However, when an image (image of a high-order hierarchy) compressed by subsampling it in this manner is expanded by simple interpolation (for example, the interpolated value of peripheral pixels), the resolution of the decoded image obtained is deteriorated.

The causes for the deterioration in resolution of the decoded image in this manner are as follows. Firstly, a subsampled image does not contain high-frequency components which are in the original image. Secondly, the pixel values of the pixels which form the image after being subsampled are not necessarily appropriate for reconstructing the original image.

The present invention has been achieved in view of such circumstances. An object of the present invention is to make it possible to subsample an image into compressed code quickly so that a decoded image which is the same (almost the same) as the original image can be obtained.

SUMMARY OF THE INVENTION

As the present invention sets out to solve these problems, the present invention is capable of producing an optimum compressed data in such a manner that decoded images almost the same in quality as the original image can be obtained.

According to one aspect of the present invention, an image encoding method compresses an original image data to a fewer number of pixels by performing a class classification to the compressed data and determining a class result corresponding to the compressed data, generating prediction data of the original data in accordance with the class result, generating prediction error information, estimating error curve information representing a relationship between the compressed data and the prediction error information, and determining an optimum compressed data in accordance with the error curve information.

According to another aspect of the present invention, an image encoding apparatus includes means for reducing a number of pixels of an original image and generating a compressed data and means for performing a class classification to the compressed data and determining a class result corresponding to the compressed data. Prediction means generates prediction data of the original data in accordance with the class result. Prediction error information means generates prediction error information representing a difference between the prediction data and the original data. Estimation means estimates error curve information representing a relationship between the compressed data and the prediction error information. Determination means determines an optimum compressed data in accordance with the error curve information.

According to yet another aspect of the present invention, the prediction data generating means includes a memory in which prediction coefficients for each clang are stored and output corresponding to the class result therefrom, the prediction coefficients for each class produced by learning in advance, using a number of training image, and prediction means generating prediction data of the original data in accordance with the read prediction coefficients and the compressed data.

According to a further aspect of the present invention, a recording medium recorded with an encoding program is prepared by reducing a number of pixels of an original image and generating a compressed data, performing a class classification to the compressed data and determining a class result corresponding to the compressed data, generating prediction data of the original data in accordance with the class result, generating prediction error information representing a difference between the prediction data and the original data, estimating error curve information representing a relationship between the compressed data and the prediction error information, and determining an optimum compressed data in accordance with the error curve information.

DESCRIPTION OF THE EMBODIMENT

The embodiment of the present invention will now be described below.

Figure 1:
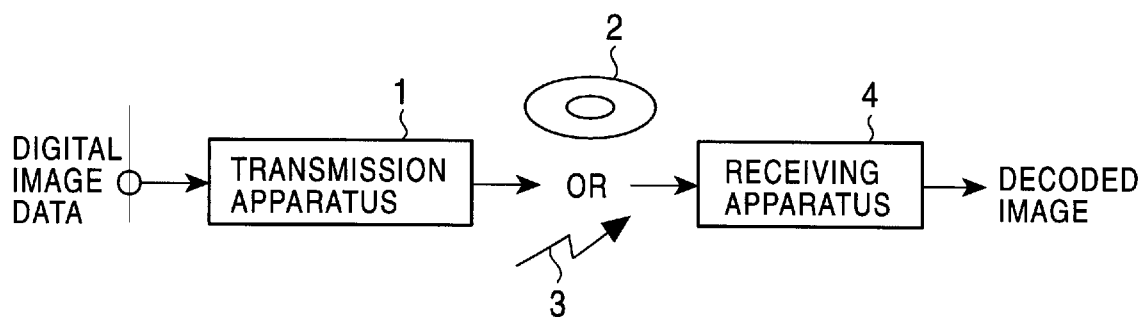
FIG. 1 is a block diagram showing an embodiment of an image processing apparatus of the present invention.

Referring now to FIG. 1, an image coding apparatus is shown.

In operation, digitized image data is supplied to a transmission apparatus 1. The transmission apparatus 1 compresses and codes the input image data by subsampling it (reducing the number of pixels), and records the resultant coded data in a recording medium 2, such as, an optical disk, magneto-optic disk, magnetic tape, phase-change disk, etc., or transmits it through a transmission line 3, such as, ground waves, a satellite line, a telephone line, a CATV network, the Internet, etc.

In a receiving apparatus 4, the coded data recorded in the recording medium 2 is reproduced, or the coded data is transmitted through the transmission line 3. This coded data is then expanded and decoded, and then the decoded image is supplied to a display device (not shown) and displayed thereon.

The image coding apparatus such as that described above is applicable to an apparatus, such as an optical disk apparatus, magneto-optic disk apparatus, or magnetic tape apparatus, for recording and reproducing an image, or an apparatus for transmitting an image, such as a television telephone apparatus, television broadcasting system, a CATV system or a network communication system. Also, since the amount of coded data output by the transmission apparatus 1 is small, the image coding apparatus of FIG. 1 is also applicable to a portable terminal, which is convenient while moving and has a low transmission rate, such as a portable telephone.

Figure 2:
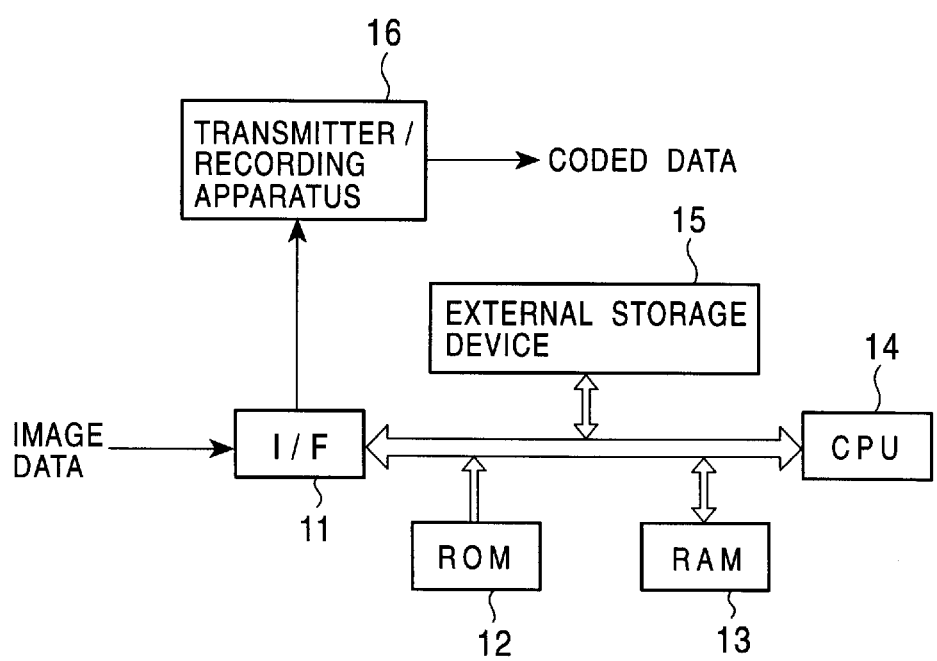
FIG. 2 is a block diagram showing an embodiment of the transmission apparatus 1 of FIG. 1 excluding a transmitter/recording apparatus 16 of FIG. 2.

Referring now to FIG. 2, a transmission apparatus 1 of FIG. 1 is shown.

In operation, an I/F (interface) 11 performs a process for receiving image data supplied from an external source and a process for transmitting coded data with respect to a transmitter/recording apparatus 16. A ROM (read only memory) 12 stores a program for IPL (initial program loading), and others. A RAM (random access memory) 13 stores a system program OS (operating system) recorded in an external storage device 15 and application programs, and stores data required for the operation of a CPU (central processing unit) 14. The CPU 14 transfers the system program and an application program from the external storage device 15 onto the RAM 13 in accordance with the IPL program, and executes an application program under the control of the system program so that a coding process such as that to be described later is performed on image data supplied from the I/F 11. The external storage device 15 is, for example, a magnetic disk apparatus, which stores the system program and an application program to be executed by the CPU 14, and also stores data required for the operation of the CPU 14. The transmitter/recording apparatus 16 records the coded data supplied from the I/F 11 in the recording medium 2 or transmits this data through the transmission line 3.

The I/F 11, the ROM 12, the RAM 13, the CPU 14, and the external storage device 15 are interconnected with each other through a bus.

In the transmission apparatus 1 constructed in the manner described above, when image data is supplied to the I/F 11, this image data is supplied to the CPU 14. The CPU 14 codes the image data and supplies the resultant coded data to the I/F 11. Upon receiving the coded data, the I/F 11 supplies this data to the transmitter/recording apparatus 16. In the transmitter/recording apparatus 16, the coded data from the I/F 11 is recorded on the recording medium 2 or transmitted through the transmission line 3.

With reference now to FIGS. 3, 4, 5, 6, 8, 11, 12, 13, 14, 15 and 16, a first embodiment of the transmission apparatus 1 (excluding the transmitter/recording apparatus 16) and the receiving apparatus is explained.

The image data (the original image data) to be coded is supplied to a compression section 21, a local decoding section 22, and an error computation section 23. The compression section 21 compresses the image data, for example, by simply subsampling it and adjusting the resultant compressed data (image data after being subsampled) under the control of the determination section 24. The adjusted data obtained as a result of the adjustment in the compression section 21 is supplied to the local decoding section 22 and the determination section 24.

The local decoding section 22 predicts the original image on the basis of the adjusted data from the compression section 21 and supplies the prediction values of the original image data to the error computation section 23. As will be described later, the local decoding section 22 performs a process for determining prediction coefficients for each predetermined class for computing prediction values by linear combination of the adjusted data, using the adjusted data and the original image data. Then the local decoding section 22 performs an adaptive processing for determining the prediction values of the original image data. As described above, the local decoding section 22 supplies the prediction values to the error computation section 23, and also supplies the prediction coefficients for each class, generated by local decoding section 22, to the determination section 24.

The error computation section 23 computes a prediction error of the prediction values from the local decoding section 22 with respect to the original image data (original image) which is input thereto. This prediction error is supplied as error information to the determination section 24.

Based on the error information from the error computation section 23, the determination section 24 determines whether it is proper for the compression section 21 to use the adjusted data output as the coded result of the original image. When the determination section 24 determines that it is not proper to use the adjusted data output by the compression section 21 as the coded result of the original image, the determination section 24 controls the compression section 21, the compressed data is adjusted, and the new adjusted data obtained is output.

On the other hand, when the determination section 24 determines that it is proper to use the adjusted data output by the compression section 21 as the coded result of the original image, the adjusted data supplied from the compression section 21 is supplied to a multiplexing section 25 as the most appropriate compressed data (hereinafter, as required, referred to as the "optimum compressed data"). The prediction coefficients for each class, supplied from the local decoding section 22, are also supplied to the multiplexing section 25.

Figure 4:
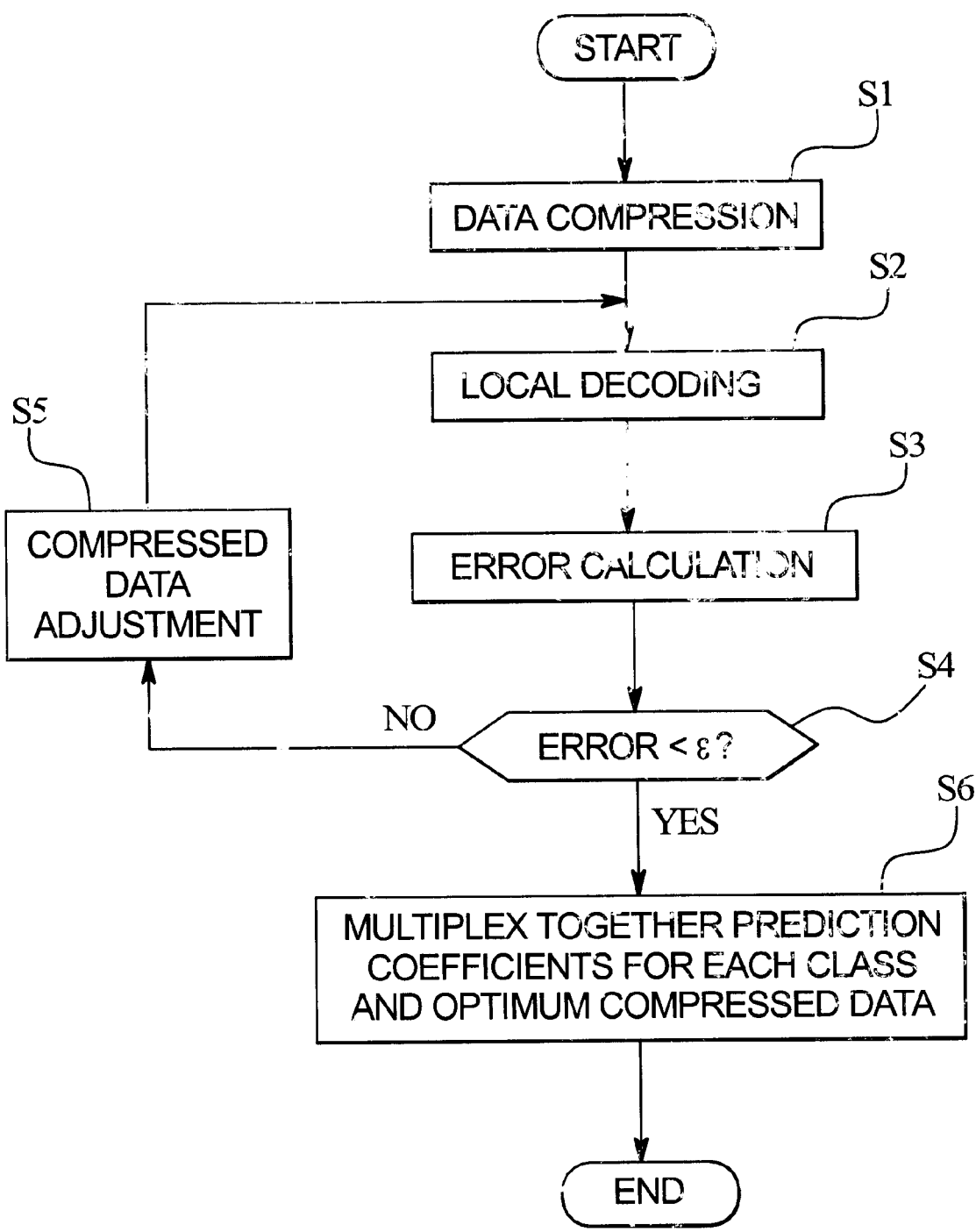
FIG. 4 is a flowchart illustrating the operation of the transmission apparatus 1 of FIG. 3.

The multiplexing section 25 multiplexes together the optimum compressed data (adjusted data) from the determination section 24 and the prediction coefficients for each class, and supplies the multiplexed result to the transmitter/recording apparatus 16 (FIG. 2) as the coded data, Next, a description is given of the operation of the transmission apparatus 1 by referring to the flowchart of FIG. 4. When image data is supplied to the compression section 21, the compression section 21 compresses the image data by subsampling it in step S1, and at first, outputs the compressed image data to the local decoding section 22 and the determination section 24 without performing adjustments thereon.

Figure 5:
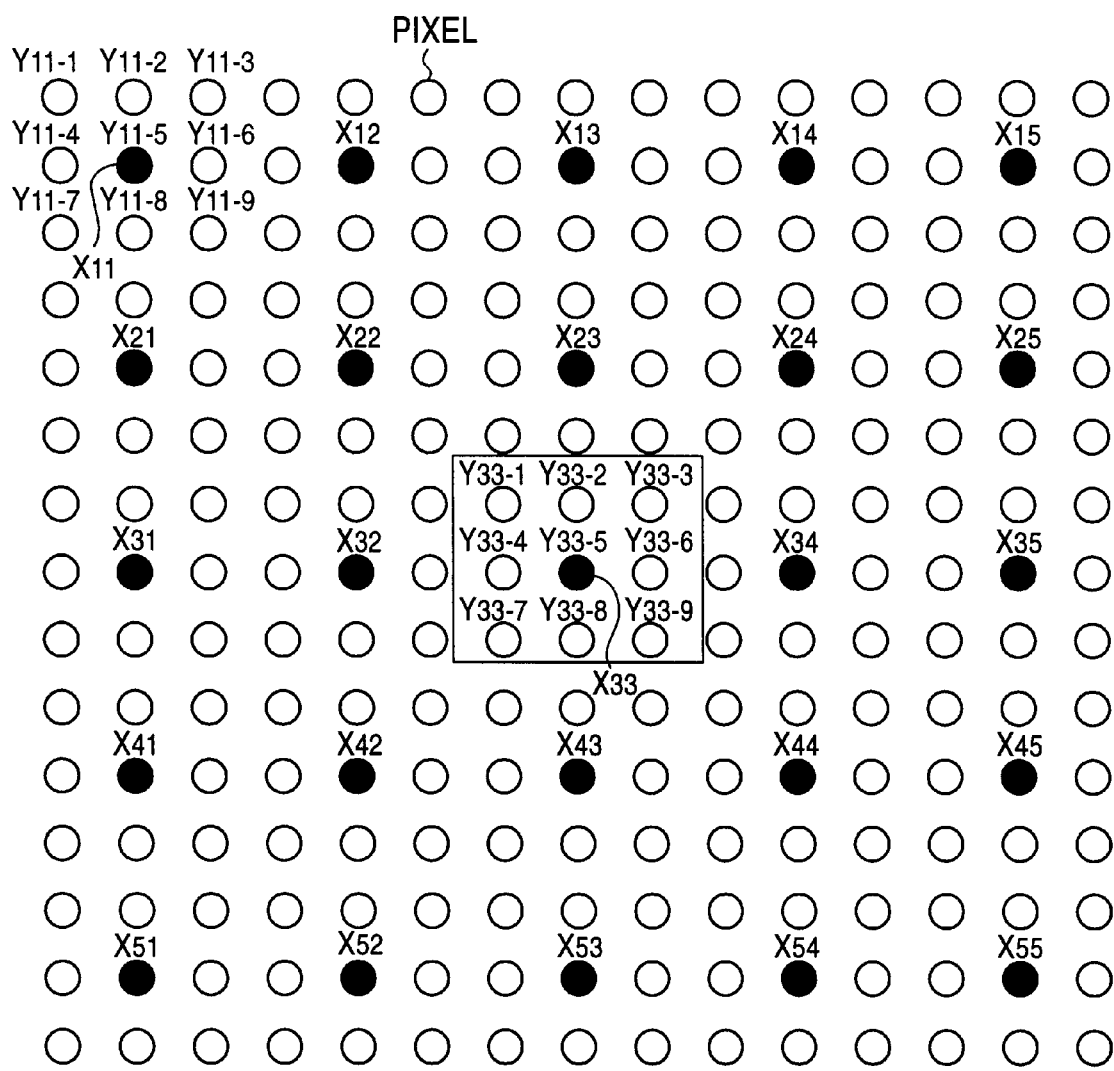
FIG. 5 is a view illustrating the process of step S1 of FIG. 4.

Here, the compression section 21 subsamples the input image data into compressed data to 1/N of the original amount. That is, the compression section 21 subsamples the image data to, for example, to 1/9 of the original amount, as shown in FIG. 5. Specifically, using nine pixels of 3×3 (horizontal × vertical) as one unit, the compression section 21 extracts only the pixel value representing the center pixel (the portion indicated by the ● mark in FIG. 5) of each unit, and deletes the other portions (the portion indicated by the ○ marks in FIG. 5). Or, the compression section 21 calculates the average value, etc. of nine pixels of 3×3, and uses it as the pixel value of the pixel at the center of the 3×3 pixels. Therefore, in this case, the compression rate is 1/9.

The compression section 21 performs processing such as that described above, for example, in one frame (or one field) unit.

Referring back to FIG. 4, in step S2, the local decoding section 22 performs the local decoding of the adjusted data (here, at first, the compressed data itself of the image data that is subsampled, as described above) from the compression section 21 (an image of a high-order hierarchy having a small number of pixels is mapped onto the image of a low-order hierarchy having a large number of pixels).

More specifically, in step S2, by using the adjusted data from the compression section 21 and the original image data, a process for determining prediction coefficients for each class for computing the prediction values of the original image by linear combination with the adjusted data is performed, and the prediction values are determined on the basis of the prediction coefficients for each class and the adjusted data. The prediction values of the original image determined in the local decoding section 22 are supplied to the error computation section 23, and also the prediction coefficients for each class are supplied to the determination section 24. Here, the image formed of the prediction values output from the local decoding section 22 is the same as the decoded image obtained on the side of the receiving apparatus 4 (FIG. 1).

When the error computation section 23 receives the prediction values of the original image from the local decoding section 22, in step S3, the error computation section 23 computes the prediction error of the prediction values from the local decoding section 22 and supplies it as error information to the determination section 24. That is, the error computation section 23, for example, subtracts the prediction values from the values of the original image data in pixel units to get an error for each value, determines the sum of the squares for the errors, and supplies it as error information to the determination section 24.

When the determination section 24 receives the error information from the error computation section 23, in step S4, the determination section 24 determines whether it is proper to use the adjusted data output from the compression Section 21 as the coded result of the original image.

That is, in step S4, a determination is made of whether or not the error information is less than a threshold value $\epsilon$. When it is determined in step S4 that the error information is not less than a threshold value $\epsilon$, it is recognized that it is not proper to use the adjusted data output from the compression section 21 as the coded data of the original image, and the process proceeds to step S5 where the determination section 24 controls the compression section 21 so as to adjust the compressed data. The compression section 21 adjusts (adjusts the pixel values of the pixels which form the image obtained by subsampling the original image) the compressed data under the control of the determination section 24, and outputs the adjusted data obtained to the local decoding section 22 and the determination section 24. Then, the process returns to step S2, and thereafter, similar processing is repeated.

When, on the other hand, it is determined in step S4 that the error information is less than a threshold value $\epsilon$, it is recognized that it is proper to use the adjusted data output from the compression section 21 as the coded data of the original image. The determination section 24 then outputs the adjusted data when the error information less than a predetermined threshold value $\epsilon$ is obtained to the multiplexing section 25 as optimum compressed data, together with the prediction coefficients for each class. In the multiplexing section 25, in step S6, the optimum compressed data from the determination section 24 and the prediction coefficients for each class are multiplexed together, the resultant coded data is output, and the processing is complete.

In the manner described above, since the adjusted data of the compressed data that is adjusted when the error information is less than a predetermined threshold value $\epsilon$ is used as the coded result of the original image, it is possible for the receiving apparatus 4 to obtain an image which is almost the same as the original image on the basis of the adjusted data.

Figure 3:
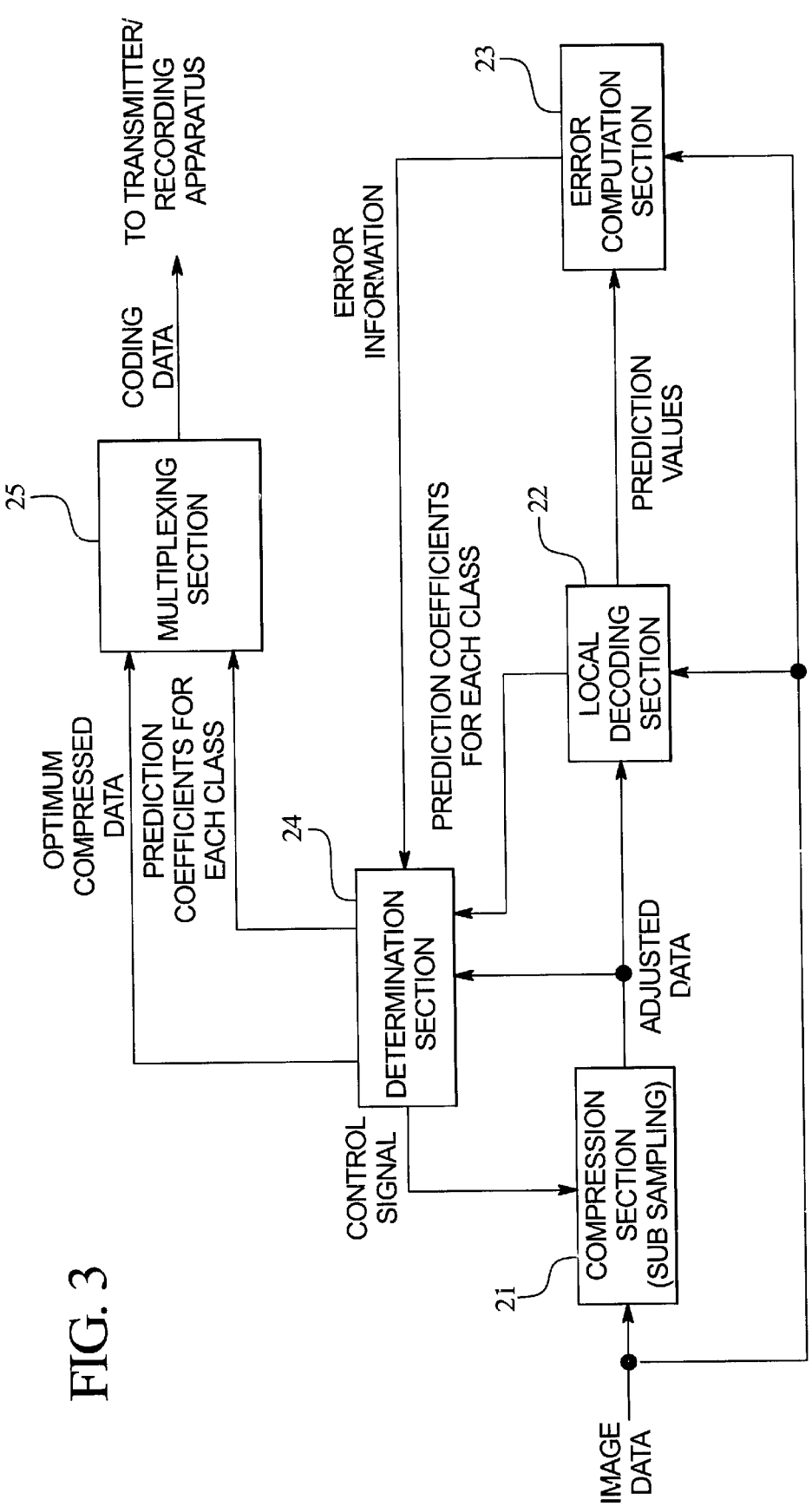
FIG. 3 is a block diagram showing a first embodiment of the functional construction of the transmission apparatus 1 of FIG. 1.
Figure 6:
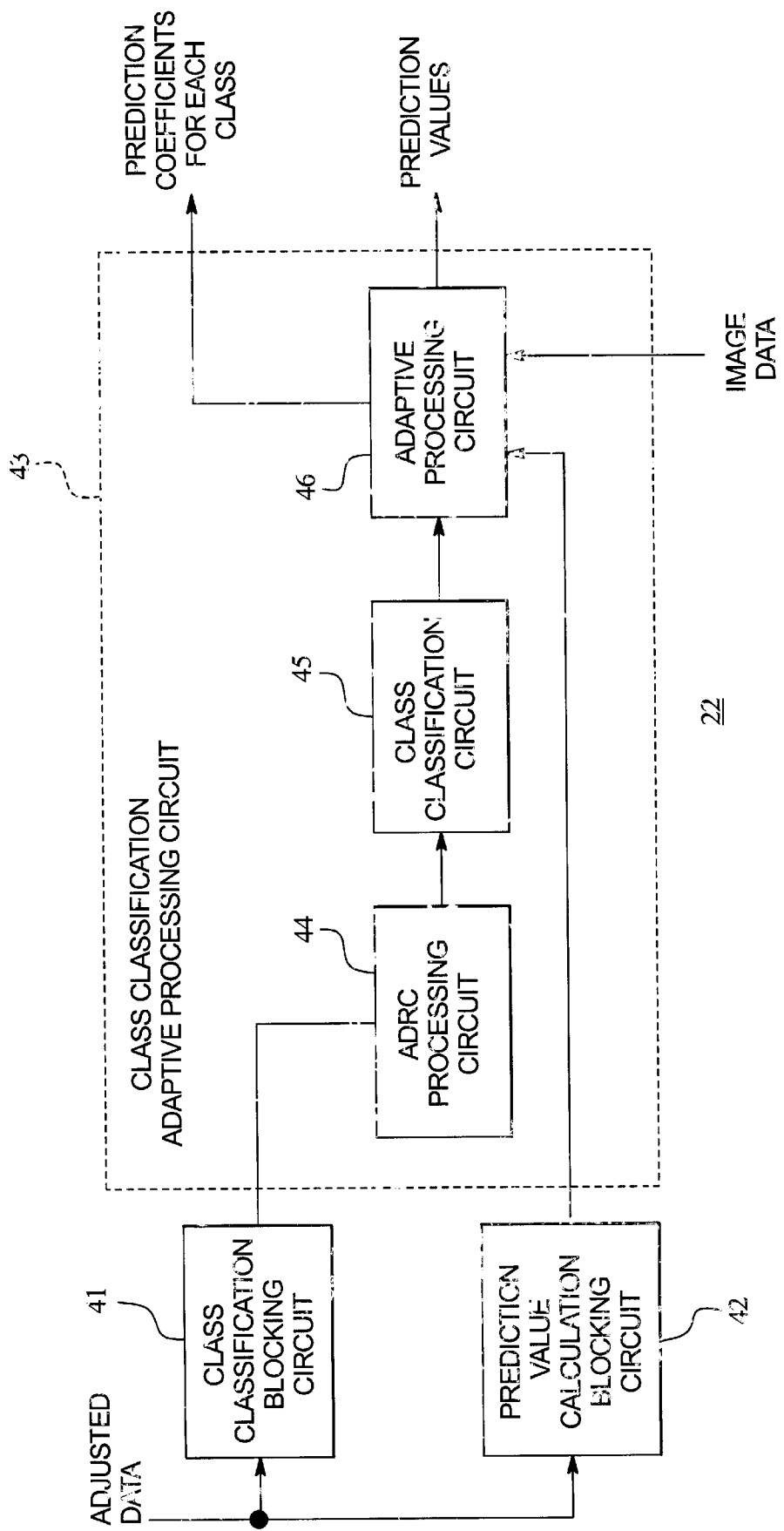
FIG. 6 is a block diagram showing an embodiment of the construction of a local decoding section 22 of FIG. 3.

FIG. 6 shows an example configuration of the local decoding section 22 of FIG. 3.

The adjusted data from the compression section 21 is supplied to a class classification blocking circuit 41 and a prediction value calculation blocking circuit 42. The class classification blocking circuit 41 divides the adjusted data into, for example, class classification blocks, in which subject adjusted data is at the center, which are units for classifying the adjusted data into a predetermined class according to the properties thereof.

More specifically, in FIG. 5, if the adjusted data (compressed data) (pixel) (the portion indicated by a ● mark in FIG. 5) which is the i-th from the top and the j-th from the left is denoted as $X_{ij}$, the class classification blocking circuit 41 forms a block for classifying a class, formed of a total of nine pixels, including itself, in the eight adjacent pixels $X_{(i-1)(j-1)}$, $X_{(i-1)j}$, $X_{(i-1)(j+1)}$, $X_{i(j-1)}$, $X_{i(j+1)}$, $X_{(i+1)(j-1)}$, $X_{(i+1)j}$, and $X_{(i+1)(j+1)}$, which are at the upper left, above, at the upper right, to the left, to the right, at the lower left, below, and at lower right of the subject adjusted data $X_{ij}$. This class classification block is supplied to a class classification adaptive processing circuit 43.

Although in this case the class classification block is formed of a block in the form of a regular square composed of 3×3 pixels, the shape of the class classification block need not be a regular square, and may be, for example, a rectangle, a cross shape, and other desired shapes. Also, the number of pixels which form the class classification block is not limited to nine pixels of 3×3.

The prediction value calculation blocking circuit 42 divides adjusted data into, for example, prediction value calculation blocks in which the subject adjusted data is at the center, which are units for calculating the prediction values of the original image. That is, in FIG. 5, if the adjusted data $X_{ij}$ (the portion indicated by a ● mark in FIG. 5) is at the center and the pixel values of nine pixels of 3×3 in the original image are denoted as $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$, and $Y_{ij}(9)$ towards the right from the leftmost and downward from the top, respectively, in order to calculate the prediction values of pixels $Y_{ij}(1)$ to $Y_{ij}(9)$, the prediction value calculation blocking circuit 42 forms a prediction value calculation block in the shape of a regular square, which block is composed of, for example, 25 pixels of 5×5, $X_{(i-2)(j-2)}$, $X_{(i-2)(j-1)}$, $X_{(i-2)j}$, $X_{(i-2)(j+1)}$, $X_{(i-2)(j+2)}$, $X_{(i-1)(j-2)}$, $X_{(i-1)(j-1)}$, $X_{(i-1)j}$, $X_{(i-1)(j+1)}$, $X_{(i-1)(j+2)}$, $X_{i(j-2)}$, $X_{i(j-1)}$, $X_{ij}$, $X_{i(j+1)}$, $X_{i(j+2)}$, $X_{(i+1)(j-2)}$, $X_{(i+1)(j-1)}$, $X_{(i+1)j}$, $X_{(i+1)(j+1)}$, $X_{(i+1)(j+2)}$, $X_{(i+2)(j-2)}$, $X_{(i+2)(j-1)}$, $X_{(i+2)j}$, $X_{(i+2)(j+1)}$, and $X_{(i+2)(j+2)}$, in which the subject adjusted data $x_{ij}$ is at the center.

Specifically, for example, for the calculation of the prediction values of nine pixels of $Y_{33}(1)$ to $Y_{33}(9)$ in the original image surrounded by the rectangle in FIG. 5, a prediction value calculation block is formed by $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, and $X_{55}$ (the subject adjusted data in this case is $X_{33}$).

The prediction value calculation block obtained in the prediction value calculation blocking circuit 42 is supplied to the class classification adaptive processing circuit 43.

Also for the class classification block, the number of pixels and shape of the prediction value calculation block are not limited to those described above in the same way as in the case of the class classification block. However, the number of pixels which form the prediction value calculation block is preferably greater than the number of pixels which form the class classification block.

When blocking such as that described above is performed (the same applies for processing other than blocking), there is a case in which corresponding pixels are not present near the picture frame of the image, In such a case, processing is performed assuming that, for example, the pixels which are the same as those which form the picture frame portion are present outside the picture frame.

The class classification adaptive processing circuit 43 comprises an ADRC (adaptive dynamic range coding) processing circuit 44, a class classification circuit 45, and an adaptive processing circuit 46, for the performance of a class classification adaptive process.

The class classification adaptive processing classifies an input signal (an input data) into several classes according to the features thereof (characteristics thereof) and performs adaptive processing appropriate for the class on the input signal of each class. Class classification adaptive processing can therefore be broadly divided into a class classification process and an adaptive process.

The class classification process and the adaptive process are now briefly described.

The class classification process is described first.

Figure 7A:
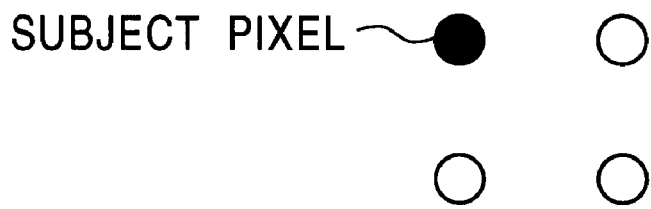
FIGS. 7A and 7B are views illustrating a class classification process.
Figure 7B:
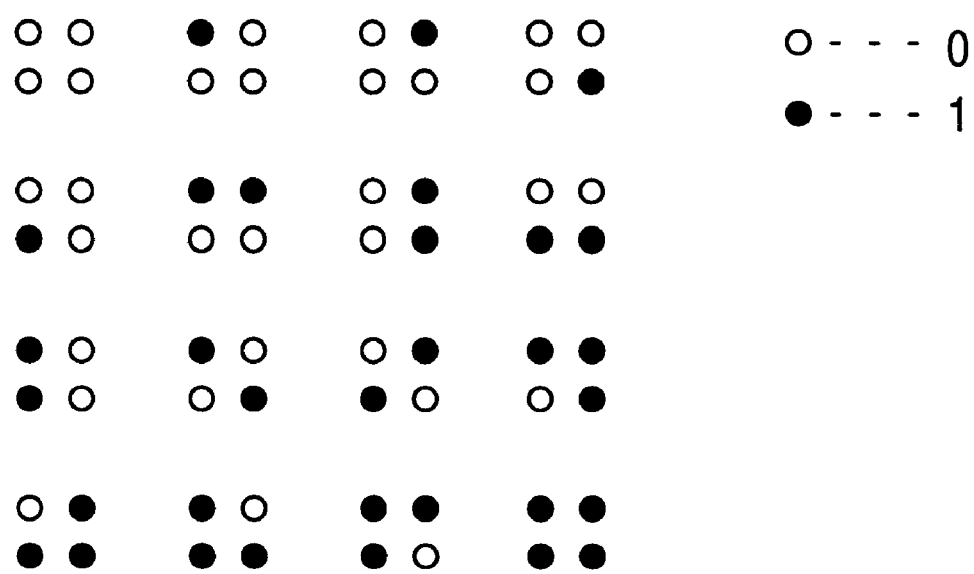

It is assumed that, for example, as shown in FIG. 7A, a block (class classification block) composed of 2×2 pixels is formed by a particular subject pixel and three pixels adjacent thereto, and that each pixel is represented by one bit (takes a level of either 0 or 1). In this case, the 2×2 four pixel block including the subject pixel can be classified into 16 $(=(2_1)_4)$ patterns according to the level distribution of each pixel, as shown in FIG. 7B. Therefore, in this case, the subject pixel can be classified into 16 patterns, and such pattern classification is a class classification process, which is performed in the class classification circuit 45.

The class classification process can also be performed by taking into consideration the activity (the complexity of the image or sharpness of change) of the image (the image within the block).

Normally, for example, about eight bits are assigned to each pixel. In this embodiment, as described above, a block for class classification is formed of nine pixels of 3×3. Therefore, if a class classification process is performed for such a class classification block, the block is classified into an extremely large number of classes of $(2_8)_9$.

Therefore, in the ADRC processing circuit 44, an ADRC process is performed on a class classification block before performing the class classification process. As a result, the number of bits of the pixels which form the class classification block is reduced, thereby reducing the number of classes.

Figure 8A:
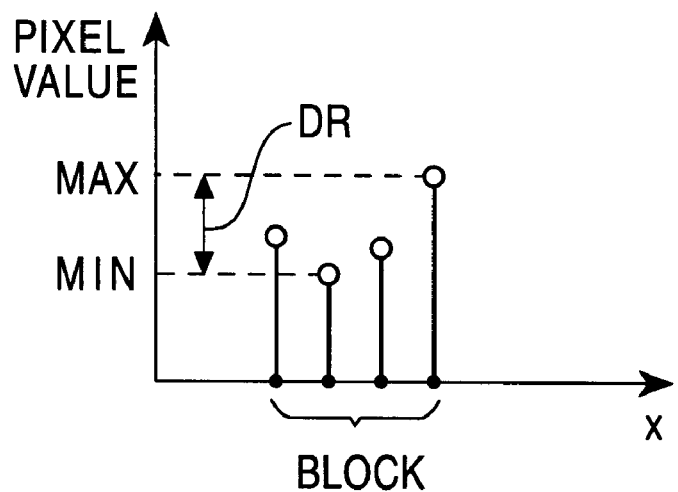
FIGS. 8A and 8B are views illustrating an ADRC process.

More specifically, for example, for the simplicity of description, a block composed of four pixels arrayed in a straight line, as shown in FIG. 8A, is considered. In the ADRC process, the maximum value MAX and the minimum value MIN of the pixel values within the block are detected. Then, the difference DR between the maximum value MAX and the minimum value (DR=MAX−MIN) is used as a local dynamic range of the block, and based on this dynamic range DR, the pixel values of the pixels which form the block are requantized to K bits.

Figure 8B:
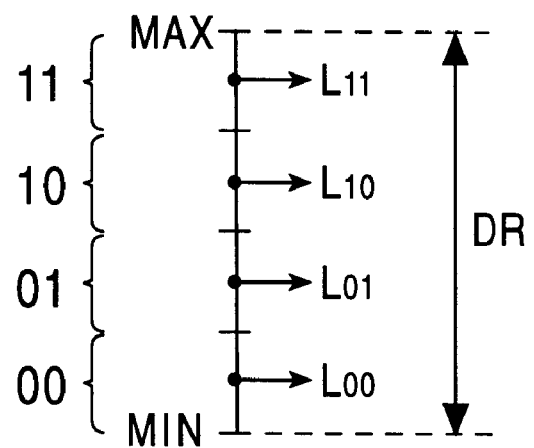

That is, the minimum value MIN is subtracted from each pixel value within the block, the subtracted value is divided by $DR/2_K$, and the value is converted into a code (ADRC code) corresponding to the divided value obtained by the division. Specifically, when, for example, K=2, as shown in FIG. 8B, a determination is made to which range obtained by dividing the dynamic range DR into equal $4(=2_2)$ parts the divided value belongs. When the divided value belongs to the lowest level range, to the second lowest level range, to the third lowest level range, or to the uppermost level range, the divided value is divided into two bits, such as 00B, 01B, 10B, or 11B (B indicates a binary notation), respectively.

The details regarding the ADRC process have been disclosed in, for example, U.S. Pat. No. 4,703,352, issued on Oct. 27, 1987 to the applicant of the present invention and such U.S. Pat. No. 4,703,352 is incorporated herein by reference.

By performing an ADRC process which requantizes by a number of bits smaller than the number of bits which are assigned to the pixels which form the block, as described above, it is possible to reduce the number of classes. Such an ADRC process is performed in the ADRC processing circuit 44.

In this embodiment, the class classification circuit 45 performs a class classification process based on an ADRC code output from the ADRC processing circuit 44. In addition to this, it is also possible to perform a class classification process on data on which, for example, DPCM (predictive coding), BTC (block truncation coding), VQ (vector quantization), a combination process of DCT (discrete cosine transform) and quantization or a combination process of Hadamard transformation and quantization has been performed.

Next, adaptive processing is described.

For example, the prediction value E[y] of a pixel value y of the original image is determined by a linear first-order combination model defined by linear combination of the pixel values (hereinafter, as required, referred to as learning data) $x_1, x_2, \ldots$ of the several pixels in the periphery of the pixel and predetermined prediction coefficients $w_1, W_2, \ldots$ In this case, the prediction value E[y] can be expressed by the following equation.

$$E[y]=w_1x_1+w_2x_2+ \quad (1)$$

For generalization of equation (1), when a matrix W composed of a set of prediction coefficients w, a matrix X composed of a set of learning data, and a matrix Y' composed of a set of prediction values E[y] are defined as follows:

$$X = \begin{pmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{pmatrix}$$

$$W = \begin{pmatrix} W_1 \\ W_2 \\ \ldots \\ W_n \end{pmatrix}, Y' = \begin{pmatrix} E[y_1] \\ E[y_2] \\ \ldots \\ E[y_m] \end{pmatrix}$$

the following observation equation holds.

$$XW=Y' \quad (2)$$

Next, a least squares method is applied to the observation equation in order to determine the prediction value E[y] close to the pixel level y of the original image. In this case, when the matrix Y composed of a set of pixel values (hereinafter, as required, referred to as teaching data) y of the original image, and a matrix E composed of a set of residuals e of the prediction value E[y] with respect to the pixel value y of the original image are defined as follows:

$$E = \begin{pmatrix} e_1 \\ e_2 \\ \ldots \\ e_m \end{pmatrix}, Y = \begin{pmatrix} y_1 \\ y_2 \\ \ldots \\ y_n \end{pmatrix}$$

the following equation holds from equation (2).

$$XW=Y+E \quad (4)$$

In this case, the prediction coefficients $w_i$ for determining the prediction value E[y] close to the pixel value y of the original image can be determined by minimizing the following square error:

$$\sum_{i=1}^{m} e_i^2$$

Therefore, the prediction coefficients $w_i$ such that the above square error differentiated by the prediction coefficients $w_i$ becomes zero, that is, the prediction coefficients $w_i$ which satisfies the following equation, is an optimal value for determining the prediction value E[y] close to the pixel value y of the original image.

$$e_1\frac{\partial e_1}{\partial w_i} + e_2\frac{\partial e_2}{\partial w_i} + \ldots + e_m\frac{\partial e_m}{\partial w_i} = 0 \quad (i=1,2,\ldots,n) \quad (4)$$

Initially, by differentiating equation (3) using the prediction coefficients $w_i$, the following equations hold.

$$\frac{\partial e_1}{\partial w_i} = x_{i1}, \frac{\partial e_i}{\partial w_2} = x_{i2}, \ldots, \frac{\partial e_i}{\partial w_n} = x_e, \quad (i = 1, 2, \ldots, m) \quad (5)$$

From equations (4) and (5), equations (6) are obtained.

$$\sum_{i=1}^{m} e_i x_{i1} = 0, \sum_{i=1}^{m} e_i x_{i2} = 0, \ldots \sum_{i=1}^{m} e_i x_{in} = 0 \quad (6)$$

In addition, in view of the relationship among the learning data x, the prediction coefficient w, the teaching data y, and the residual e in the residual equation of equation (3), the following regular equations can be obtained from equations (6).

$$\begin{cases} \left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) W_n = \left(\sum_{i=1}^{m} x_{i1} y_i\right) \\ \left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \left(\sum_{i=1}^{m} xi2 y_i\right) \\ \left(\sum_{i=1}^{m} x_{in} x_{i1}\right) w_1 + \left(\sum_{i=1}^{m} x_{in} x_{i2}\right) w + \ldots + \left(\sum_{i=1}^{m} x_{in} x_{in}\right) w = \left(\sum_{i=1}^{m} x_{in} y_i\right) \end{cases} \quad (7)$$

The regular equation of equation (7) has just the same number as the number of estimation coefficients w to be obtained. Thus, by solving equations (7), optimal prediction coefficients w can be determined. For solving equations (7), for example, a sweeping-out process (Gauss-Jordan elimination process), etc., can be applied.

In the manner described above, determining optimal prediction coefficients w for each class and using the determined prediction coefficients w in equation (1) to determine the prediction value E[y] close to the pixel value y of the original image is adaptive processing. This adaptive processing is performed in the adaptive processing circuit 46. Adaptive processing differs from interpolation processing in that components which are not included in the subsampled image and which are included in the original image are reproduced. In other words, as long as equation (1) is viewed, the adaptive processing is identical to interpolation processing with a commonly called "interpolation filter". However, since prediction coefficients w corresponding to tap coefficients of the interpolation filter are determined by, as it were, learning, using teaching data y, the components included in the original image can be reproduced. From this fact, it may be said that the adaptive processing has, as it were, the function of creating an image.

Figure 9:
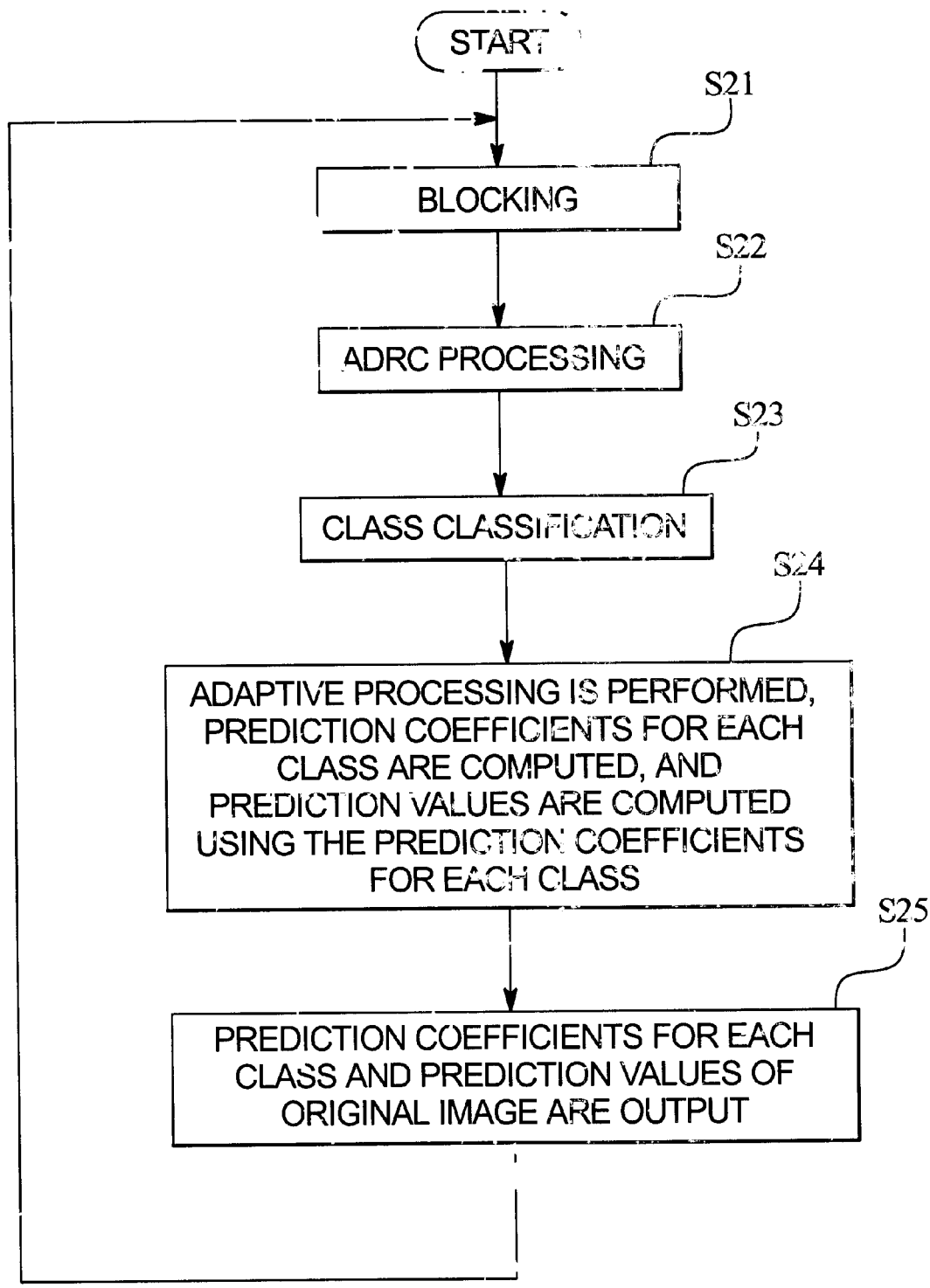
FIG. 9 is a flowchart illustrating the operation of the local decoding section 22 of FIG. 6.

Next, referring to the flowchart of FIG. 9, the process of the local decoding section 22 of FIG. 6 is described.

In the local decoding section 22, initially, in step S21, the adjusted data from the compression section 21 is formed into blocks. That is, in the class classification blocking circuit 41, the adjusted data is formed into class classification blocks of 3×3 pixels in which the subject adjusted data is at the center and is supplied to the class classification adaptive processing circuit 43. Also, in the prediction value calculation blocking circuit 42, the adjusted data is formed into prediction value calculation blocks of 5×5 pixels in which the subject adjusted data is at the center and is supplied to the class classification adaptive processing circuit 43.

As described above, in addition to the class classification blocks and the prediction value calculation blocks, the original image data is supplied to the class classification adaptive processing circuit 43. The class classification blocks are supplied to the ADRC processing circuit 44, and the prediction value calculation blocks and the original image data are supplied to the adaptive processing circuit 46.

Upon receiving the class classification blocks, in step S22, the ADRC processing circuit 44 performs, for example, a one-bit ADRC process (ADRC which performs requantization by one bit) on the class classification blocks, thereby the adjusted data is converted (coded) into one bit and is output to the class classification circuit 45. The class classification circuit 45 performs in step S23 a class classification process on the class classification blocks on which the ADRC process has been performed. That is, the state of the level distribution of the pixels which form the class classification block on which the ADRC process has been performed is detected, and the class (the class of the subject adjusted data (the adjusted data placed in the center) which form the class classification block) to which the class classification block belongs is determined. This class determination result is supplied as class information to the adaptive processing circuit 46.

In a case in which a class classification process is to be performed on the entire class classification block composed of nine pixels of 3×3 on which the one-bit ADRC process has been performed, each class classification block is classified into any one of the $512(=(2_1)_9)$ classes.

The process proceeds to step S24 where the adaptive processing circuit 46 performs an adaptive process for each class on the basis of the class information from the class classification circuit 45, thereby computing the prediction coefficients for each class and the prediction values of the original image data of one frame.

More specifically, in this embodiment, for example, 25×9 prediction coefficients are computed for each class from the original image data for one frame and the adjusted data. Furthermore, the prediction values for a total of nine pixels of a pixel of the original image, when one particular adjusted data is taken note of, corresponding to the subject adjusted data and eight pixels of the original image adjacent to the pixel are computed by the performance of an adaptive process by using the 25×9 prediction coefficients corresponding to the class information of the subject adjusted data, and the prediction value calculation blocks composed of 5×5 pixels in which the subject adjusted data is at the center.

Specifically, it is assumed that, for example, class information C for the class classification block composed of 3×3 adjusted data $X_{22}$, $X_{23}$, $X_{24}$, $X_{32}$, $X_{33}$, $X_{34}$, $X_{42}$, $X_{43}$, and $X_{44}$ shown in FIG. 5, in which the adjusted data (the subject adjusted data) $X_{33}$ is at the center, is output from the class classification circuit 45, and as a prediction value calculation block corresponding to the class classification block, a prediction value calculation block composed of adjusted data $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}X_{41}$, $X_{42}$, $X_{43}$, $X_{44}$, $X_{45}$, $X_{51}$, $X_{52}$, $X_{53}$, $X_{54}$, and $X_{55}$ of 5×5 pixels, in which the adjusted data $X_{33}$ is at the center, is output from the prediction value calculation blocking circuit 42. First, the adjusted data which form the prediction value calculation block is taken as learning data, and the 3×3 pixel (the portion surrounded by the rectangle in FIG. 5) values $Y_{33}(1)$ to $Y_{33}(9)$ centered about the adjusted data $X_{33}$, in the original image, are taken as teaching data, so that the regular equation shown in equation (7) is satisfied.

Furthermore, for example, for one frame of a predetermined period, a regular equation is satisfied in a similar manner for the other prediction value calculation blocks corresponding to the class classification blocks which are classified into the same class information C. When regular equations of a number capable of computing prediction coefficients $w_1(k)$ to $w_{25}(k)$ (in this embodiment, since 25 learning data are used to determine one prediction value, 25 prediction coefficients w are required) for determining the prediction value $E[Y_{33}(k)]$ of the pixel value $Y_{33}(k)$ (where $k=1, 2, \ldots, 9$), the process for satisfying the regular equation is carried out in step S24 until regular equations of such a number are obtained), the solving of the regular equation computes the prediction coefficients $w_1(k)$ through $w_{25}(k)$ which are most appropriate for determining the prediction value $E[Y_{33}(k)]$ of the pixel value $Y_{33}(k)$ with respect to the class information C. This process is performed for each class, thereby 25×9 prediction coefficients are computed (since 9 prediction values are determined using 25 adjusted data, the number of prediction coefficients for each class becomes 25×9).

Then, using the prediction coefficients corresponding to the class information C and the prediction value calculation block, the prediction value $E[Y_{33}(k)]$ is determined on the basis of the following equation corresponding to equation (1).

$$E[Y_{33}(k)]=w_1(k)X_{11}+w_2(k)X_{12}+w_3(k)X_{13}+w_4(k)X_{14}$$
$$+w_5(k)X_{15}+w_6(k)X_{21}+w_7(k)X_{22}+w_8(k)X_{23}+w_9(k)X_{24}+w_{10}(k)X_{25}+w_{11}(k)X_{31}+w_{12}(k)X_{32}$$
$$+w_{13}(k)X_{33}+w_{14}(k)X_{34}+w_{15}(k)X_{35}+w_{16}(k)X_{41}+w_{17}(k)X_{42}+w_{18}(k)X_{43}+w_{19}(k)X_{44}+w_{20}(k)X_{45}$$
$$+w_{21}(k)X_{51}+w_{22}(k)X_{52}+w_{23}(k)X_{53}+w_{24}(k)X_{54}+w_{25}(k)X_{55} \quad (8)$$

In step S24, after 25×9 prediction coefficients are determined for each class in the manner described above, 3×3 prediction values are calculated in units of 3×3 pixels of the original image centered about the subject adjusted data for each block by using the prediction coefficients for each class.

Thereafter, in step S25 the 25×9 prediction coefficients for each class are supplied to the determination section 24, and the prediction values of the original image are supplied to the error computation section 23. Then, the process returns to step S21, and thereafter, similar processing is repeated until the optimum compressed data is determined, for example, in one frame (or one field) unit.

The embodiment as described above is disclosed in U.S. application Ser. No. 08/893,202, filed Jul. 15, 1997.

In the embodiment of FIG. 4, the adjusted data that the compressed data is adjusted, when the error information falls below the threshold value $\epsilon$, is used as the coded result of the original image. In this case, generally, if the predetermined threshold value $\epsilon$ is increased, the number of repetitions of steps S2 to S5 decreases, and the processing speed increases. However, the image quality of the decoded image obtained on the receiving apparatus 4 side deteriorates.

From the viewpoint of the image quality of the decoded image, the threshold value (is most preferable when it is greater than the minimum value of the error information obtained from the original image and as close to the minimum value as possible. In this case, in the transmission apparatus 1 of FIG. 3 of the present invention, in practical terms, a process, for example, in accordance with the flowchart shown in FIG. 10 must be performed.

More specifically, initially, in step S31, in the same way as in step S1 of FIG. 4, compressed data is produced by the compression section 21, and the process proceeds to step S32. In step S32, in the compression section 21, one of the compressed data (one pixel) is selected as a pixel to be adjusted, and then the process proceeds to step S33 where an initial value, for example, 0, is set in the pixel value X of the pixel to be adjusted. Here, the compressed data is assumed to take an integer value, for example, in a range of 0 through $X_{MAX}$ (>0). Hereinafter, the image of one frame (or one field) composed of compressed data is referred to as a compressed image.

The compressed image including the pixel to be adjusted is supplied as adjusted data from the compression section 21 to the local decoding section 22 and the determination section 24. Upon receiving the adjusted data from the compression section 21, in step S34, the local decoding section 22 determines prediction coefficients for each class by using the adjusted data and the original image data in the above-described way and performs the local decoding of the adjusted data by using the prediction coefficients for each class. The prediction values of the original image obtained as a result of the local decoding are supplied to the error computation section 23, and the prediction coefficients for each class are supplied to the determination section 24.

In step S35, the error computation section 23 computes the prediction error of the prediction values from the local decoding section 22 with respect to the original image data in the same way as in step S3 of FIG. 4 and supplies it as error information to the determination section 24. In step S36, the determination section 24 controls the compression section 21 so that this error information is stored and only the pixel value X of the pixel to be adjusted of the adjusted data supplied from the compression section 21 is stored, and further, the pixel value X of the pixel to be adjusted is incremented by 1.

In step S37, the compression section 21 increments by 1 the pixel value X of the pixel to be adjusted in accordance with the control of the determination section 24 and outputs the compressed image, including the pixel to be adjusted, as adjusted data to the local decoding section 22 and the determination section 24. In step S38, the local decoding section 22 determines the prediction coefficients for each class and the prediction values by using the adjusted data from the compression section 21 in the same way as in the case of step S34. Then, the prediction values or the prediction coefficients are supplied to the error computation section 23 or the determination section 24, respectively.

In step S39, the error computation section 23 computes a prediction error and supplies it as error information to the determination section 24 in the same way as in the case of step S35. In step S40, the determination section 24 determines whether or not the error information determined in step S39 at this time (hereinafter referred to as current error information, as required) is smaller than the error information stored in the determination section 24 (hereinafter referred to as stored error information, as required).

When it is determined in step S40 that the current error information is smaller than the stored error information, the process proceeds to step S41 where the determination section 24 replaces the presently stored error information with the current error information and stores it as newly stored error information. Furthermore, the determination section 24 replaces the pixel value X of the pixel to be adjusted which has been stored presently from among the adjusted data supplied from the compression section 21 with the pixel value of the pixel to be adjusted and stores it, and the process proceeds to step S42.

When, on the other hand, it is determined in step S40 that the current error information is not smaller than the stored error information, step S41 is skipped, and the process proceeds to step S42 where it is determined whether the pixel value X of the pixel to be adjusted is equal to the maximum value MAX in the compression section 21. When it is determined that the pixel value X of the pixel to be adjusted is not equal to the maximum value MAX, that is, when the pixel value X is smaller than the maximum value MAX, the process returns to step S37, and hereafter, the process of steps S37 to S42 is repeated.

Therefore, in the determination section 24, the compressed data other than the pixel to be adjusted is fixed, and the minimum error information obtained when the pixel value X of the pixel to be adjusted is changed, and the pixel value X of the pixel to be adjusted when the minimum error information is obtained are stored. In the determination section 24, the stored error information is deleted when a pixel (compressed data) other than the particular pixel is to be adjusted. However, the pixel value X is retained until processing of the frame (or the field) to be coded is terminated. Then, when the pixel retaining the pixel value X is no longer a pixel to be adjusted in the compression section 21, the determination section 24 controls the compression section 21 so that the pixel value of the pixel is fixed to the stored pixel value X. As a result, the adjusted data which has already been a pixel to be adjusted from among the adjusted data output from the compression section 21 is fixed to the pixel value stored in the determination section 24.

When, on the other hand, it is determined in step S42 that the pixel value X of the pixel to be adjusted is equal to the maximum value MAX, the process proceeds to step S43 where it is determined whether the processing of step S32 through S42 has been performed on all the pixels (compressed data) which form the compressed image by using all the pixels as the pixels to be adjusted. When it is determined in step S43 that processing has not yet been performed by using all the compressed data as the pixels to be adjusted, the process returns to step S32 where a pixel (compressed data) which has not yet been an object for adjustment is selected as a new pixel to be adjusted, and processing of step S33 and subsequent steps are repeated.

When it is determined in step S43 that processing has been performed by using all the compressed data as the pixels to be adjusted, the process proceeds to step S44 where the determination section 24 assumes the adjusted data (pixel values) for one frame (or one field) held by itself as optimum compressed data, and outputs it to the multiplexing section 25, together with the prediction coefficients for each class finally received from the local decoding section 22. Furthermore, in step S44, the optimum compressed data from the determination section 24 and the prediction coefficients for each class are multiplexed together in the multiplexing section 25, and the resultant coded data is output, thus terminating the process.

As a result of the above, it is possible to obtain adjusted data and prediction coefficients for each class when the error information becomes a minimum. In this case, it is possible for the receiving apparatus 4 to obtain a decoded image having better image quality.

Figure 10:
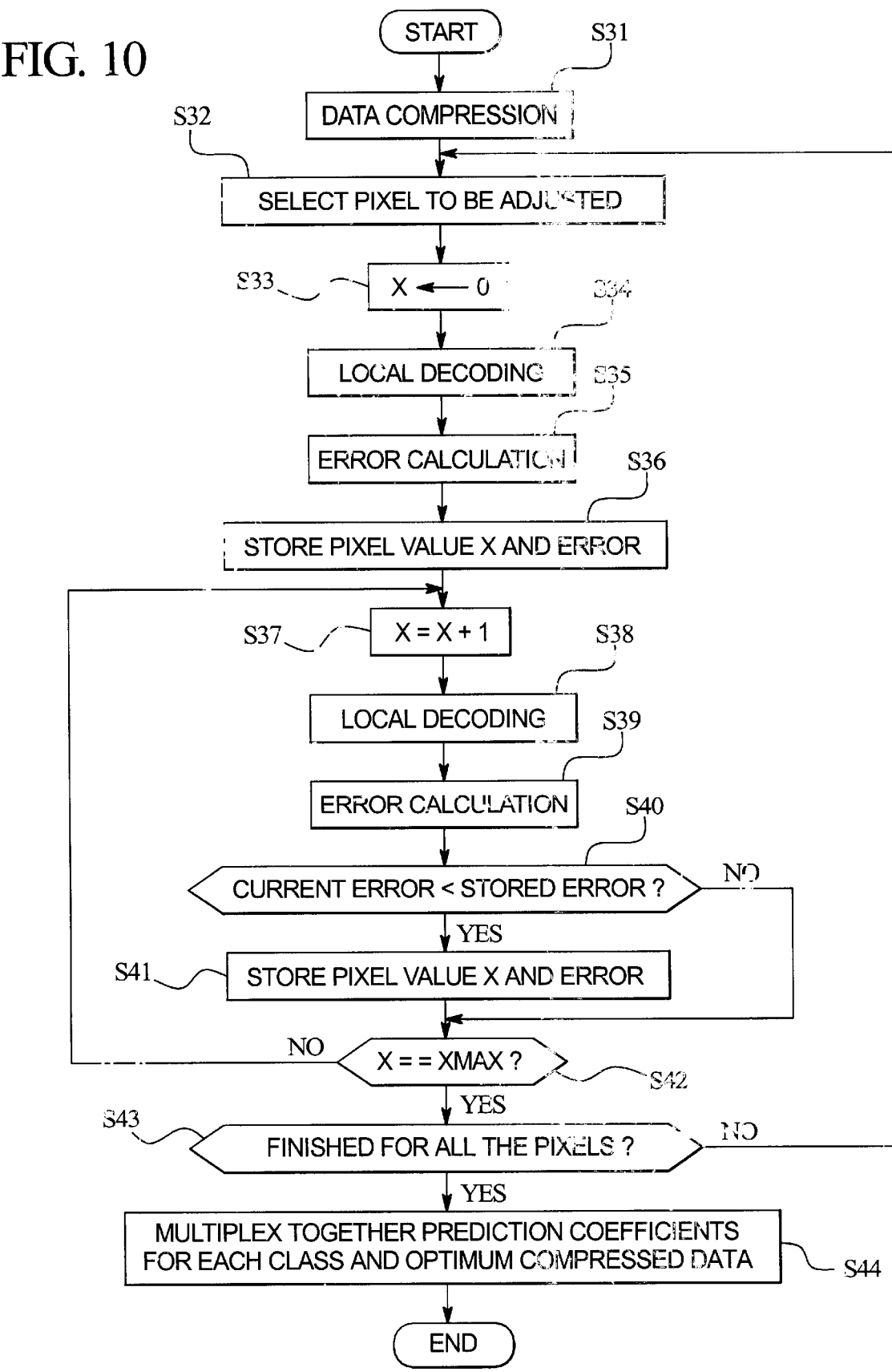
FIG. 10 is a flowchart illustrating the operation of the transmission apparatus 1 of FIG. 3 when a full search process is performed.

However, according to the processing of FIG. 10, the pixel values of the pixels (compressed data) which form the compressed image must be changed from zero, which is a minimum value, to a maximum value MAX in order to perform local decoding and the computation of the error information. Furthermore, such processing must be repeated for the same number of times as the number of pixels which form the compressed image. That is, the processing of FIG. 10 is a commonly called full search process which checks all of the pixel values that the pixels which form the compressed image can take in order to search a minimum error information, and therefore, the processing takes time. Specifically, in the full search process, if, for example, the pixel value is represented by eight bits, and the compressed image is composed of 640×480 pixels, the local decoding and the computation of the error information must be performed $640 \times 480 \times 2^8$ times.

Figure 11:
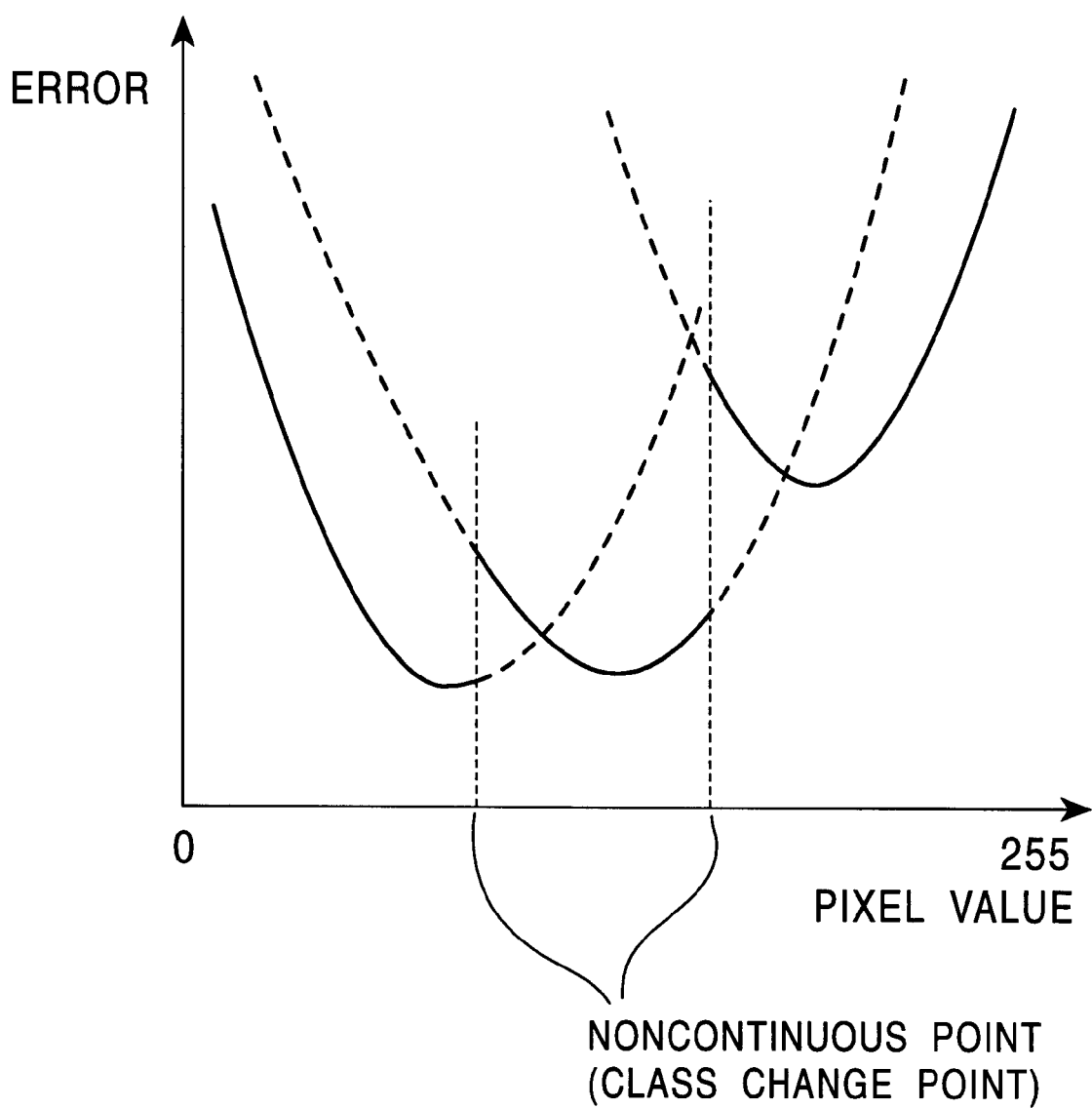
FIG. 11 is a view showing the relationship between the pixel values and the error information.

In a case in which one of the compressed data is used as a pixel to be adjusted and the pixel value is changed, the relationship between the pixel value and the error information is as shown, for example, in FIG. 11. That is, the relationship between the pixel value and the error information is expressed, for example, by a second-order curve.

Therefore, generally speaking, if the minimum value of the second-order curve is determined, it is the minimum value of the error information, and the pixel value in that case is an optimum value. Meanwhile, the second-order curve can be determined if three points are given. Therefore, if the relationship between the pixel value and the error information is expressed by one second-order curve, a second-order curve is determined on the basis of three arbitrary pixel values. Then, the error information corresponding to each of the three arbitrary pixel values, and further, the minimum value is determined, making it possible to obtain the optimum pixel value of the pixel to be adjusted.

However, as shown in FIG. 11, the relationship between the pixel value and the error information is generally expressed by a plurality of second-order curves, and a noncontinuous point is present. That is, as a result of changing the pixel value of the pixel to be adjusted, the class of the class classification block including the pixel to be adjusted may change. When the pixel value becomes such a point (hereinafter referred to as a class change point, as required), the relationship between the pixel value and the error information becomes noncontinuous.

Therefore, it is difficult to determine the relationship between the noncontinuous pixel values and the error information from three arbitrary points. Also, even if one second-order curve expressing the relationship between the noncontinuous pixel values and the error information is obtained from three arbitrary points and the minimum value is obtained, there is a case in which the minimum value is a local minimum value in view of the relationship between the noncontinuous pixel values and the error information.

Figure 12:
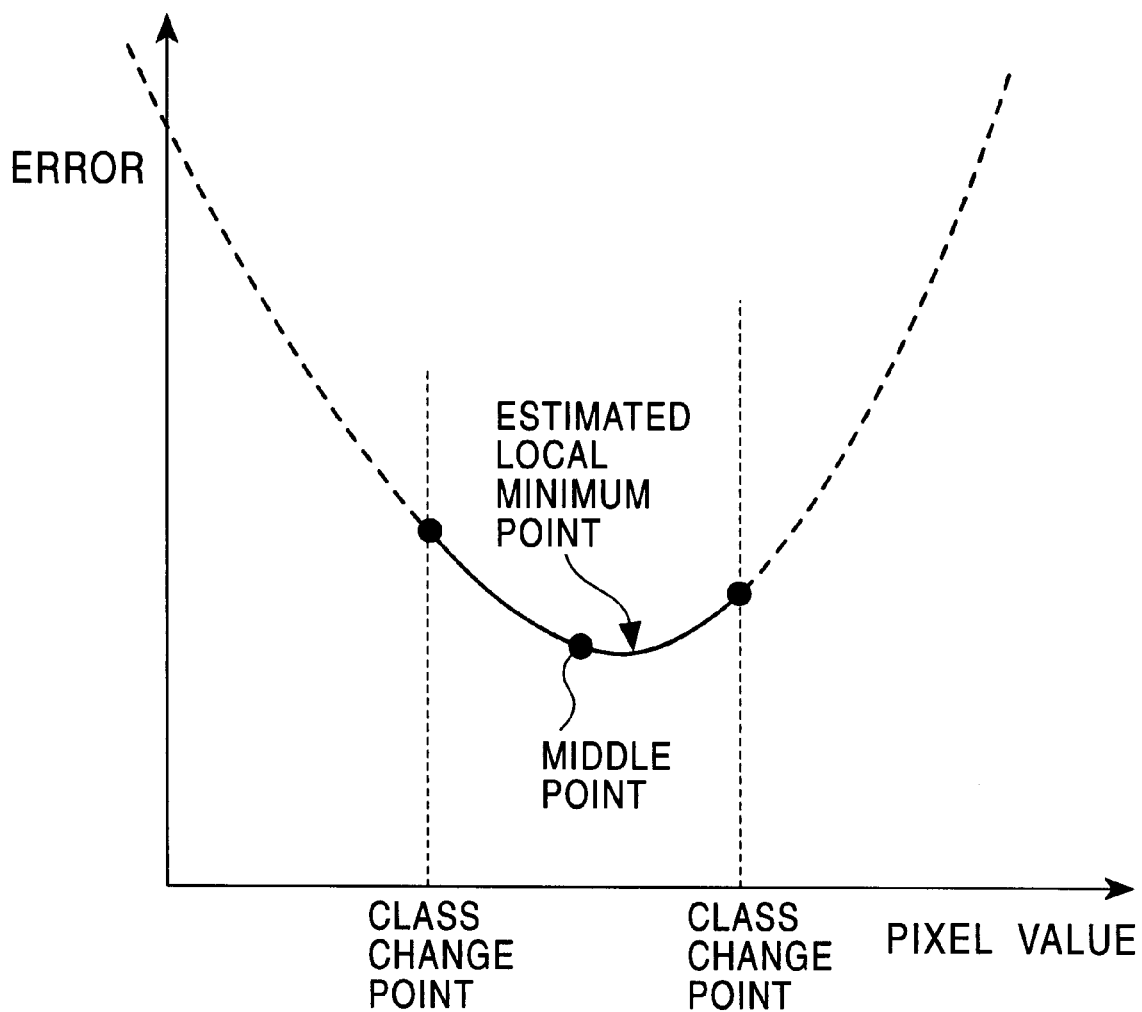
FIG. 12 is a view illustrating a method for determining minimum error information.

Accordingly, for example, as shown in FIG. 12, a class change point, which is a noncontinuous point of a curve expressing the relationship between the noncontinuous pixel values and the error information, is determined, and from two class change points which divide a particular second-order curve and a middle point, which is a point between the two class change points, the continuous second-order curve (hereinafter referred to as an error curve) is determined. It will be appreciated that the point between two class change points need not particularly be a middle point as long as it is a point between two class change point. In a similar manner, the other error curve is determined, and as a result, a curve expressing the relationship between the noncontinuous pixel values and the error information is estimated, and thus the minimum value, and in turn, the optimum pixel value (the pixel value when the error information becomes a minimum) is determined. The minimum value of the error information can be determined, for example, by determining the local minimum values of a plurality of error curves and detecting the minimum value among them.

In this case, a class change point must be computed first. A method for computing this class change point is described.

Figure 13:
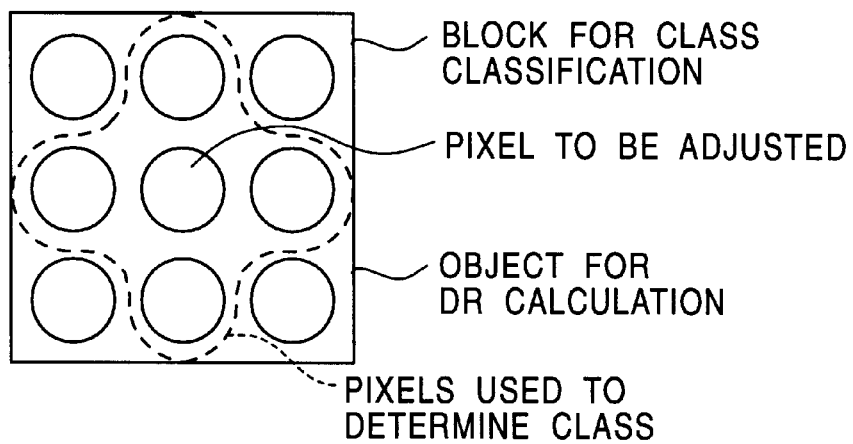
FIG. 13 is a view illustrating a method for computing a class change point.

It is assumed that, au shown in FIG. 13, when a pixel to be adjusted is taken note of, a class classification block of 3×3 pixels is formed by centering the pixel to be adjusted. Furthermore, in the ADRC described with reference to FIG. 8, with all nine pixels which form the class classification block used as objects, the dynamic range DR is calculated, and one-bit ADRC is performed. Therefore, as an ADRC code, for example, either 0 or 1 is obtained. Here, when the value such that the minimum value is subtracted from the pixel values which form the class classification block is equal to or greater than a middle value (=DR/2) of the dynamic range DR, "1" is output, and when that value is smaller than DR/2, "0" is output.

Furthermore, it is assumed that in this embodiment the class classification described with reference to FIG. 7 is performed on a total of five pixels (the portions surrounded by the dotted line in FIG. 13) which include the pixel at the center and the adjacent pixels above, below, to the left, and to the right, from among the pixels which form the class classification block after the ADRC process (where the pixels which are actually used for class classification are hereinafter referred to as class classification object pixels, as required). Therefore, in this case, the number of classes is 32 (=$2^5$).

However, the object pixels for ADRC and the class classification object pixels are not limited to those described above. Although the object pixels for ADRC and the class classification object pixels are different here, these may be the same.

Figure 14:
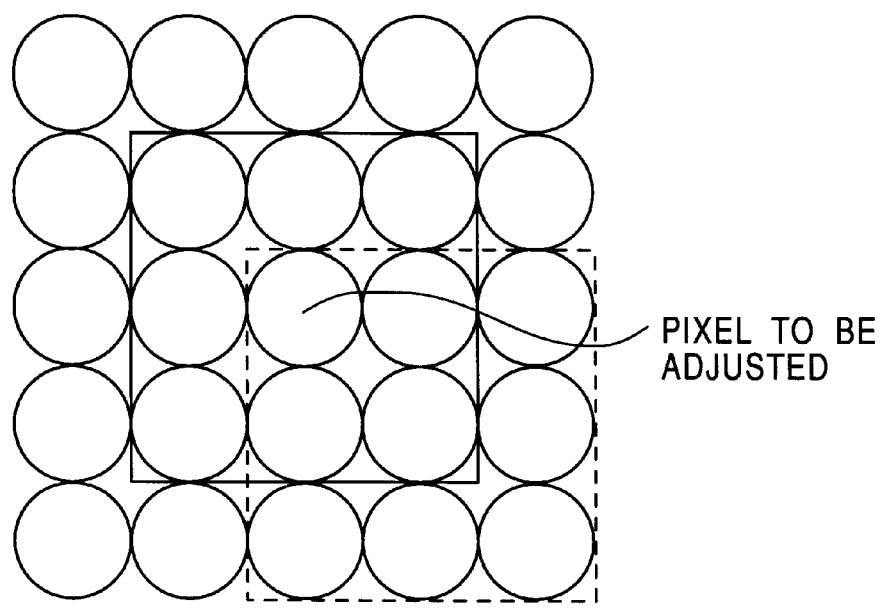
FIG. 14 is a view illustrating a method for computing a class change point.

When the class classification block is composed of 3×3 pixels, as blocks whose class may change as a result of the changing of the pixel value of the pixel to be adjusted, in addition to, as shown by surrounding the block by the solid line in FIG. 14, the class classification block in which the pixel to be adjusted is positioned at the center, there are eight class classification blocks including the pixel to be adjusted. That is, as shown by surrounding the block by the dotted line in FIG. 14, there is a class classification block including the pixel to be adjusted in the upper left thereof, and further, there are class classification blocks including the pixel to be adjusted above, in the upper right, to the left, to the right, in the lower left, below, and in the lower right. Therefore, when the pixel value of the pixel to be adjusted is changed and the class change point with respect to the pixel to be adjusted is computed, the changes of classes of the above-described nine total class classification blocks must be considered. That is, it is necessary to determine class change points regarding nine class classification blocks with respect to one pixel to be adjusted.

Next, a description will be given of a method for computing a class change point when, taking note of one particular class classification block, the pixel values of particular pixels (pixels which are to be adjusted) which form the class classification block are changed.

As described with reference to FIG. 13, in the case where a one-bit ADRC process is performed on all the pixels which form the class classification block and a class classification process is performed on some of the pixels, the computation of the class change point can be considered by distinguishing from among the pixels which form the class classification block between a case in which a pixel whose pixel value changes is an object pixel for a class classification process, that is, a class classification object pixel, and a case in which a pixel whose pixel value changes is a pixel other than a class classification object pixel.

Figure 15A:
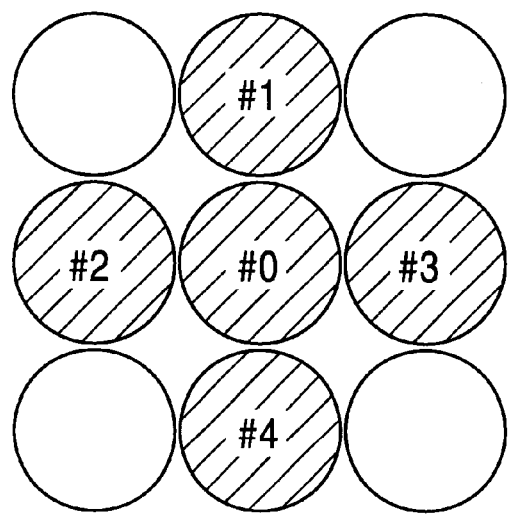
FIGS. 15A and 15B are views illustrating a method for computing a class change point.
Figure 15B:
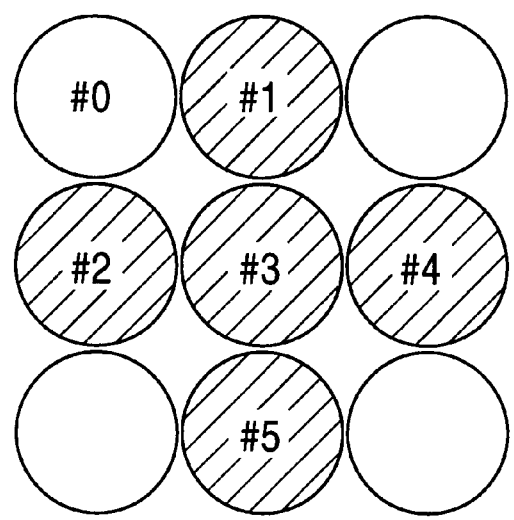

More specifically, it is possible to distinguish between a case in which, as shown in FIG. 15A, the pixel value changes of the pixel positioned, for example, at the center of the class classification block, and a case in which, as shown in FIG. 15B, the pixel value changes of the pixel positioned, for example, in the upper left of the class classification block.

First, the case shown in FIG. 15A (the case where the pixel whose pixel value changes is one of the class classification object pixels) is considered first. Here, as shown in FIG. 15A, for example, the pixel positioned at the center of the class classification block is denoted as pixel #0, and the adjacent pixel above, to the left, to the right, and below it are denoted as pixels #1 to #4, respectively. Also, the pixel values of the pixels #0 to #4 are denoted as $X_0$ to $X_4$, respectively, and it is assumed that the pixel #0 is a pixel to be adjusted and the pixel value $X_0$ changes. Furthermore, the maximum value or the minimum value of the pixel values of the eight pixels, excluding pixel #0, from among the nine pixels which form the class classification block is denoted as max or min, respectively. Also, the pixel value is represented by, for example, eight bits, and therefore, the maximum value or the minimum value is 255 or 0, respectively.

Figure 16A:
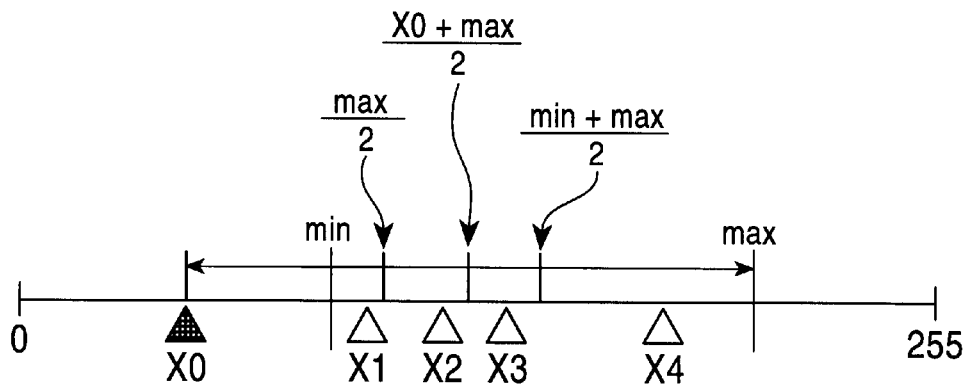
FIGS. 16A, 16B and 16C are views illustrating a method for computing a class change point.

Initially, when the pixel value $X_0$ changes in the range of $0 \leq X_0 < \min$, the change of the pixel value $X_0$ exerts an influence on the dynamic range DR used to perform ADRC, that is, a threshold value $(x_0+\max)/2$ for causing the ADRC result of the pixels #0 to #4, shown in FIG. 16A, to be set to either 1 or 0.

If it is assumed that the pixel value $X_0$ increases from 0 to min, in this case, the threshold value $(X_0+\max)/2$ shown in FIG. 16A also increases. Therefore, the ADRC result of the pixel #0 always remains at 0. Also, regarding pixels #1 to #4 where the ADRC result is "0" when the pixel value $X_0$ is 0, the ADRC result always remains at "0".

In this case, that is, the ADRC result of pixels #1 to #4, which may change as a result of the changing of the pixel value $X_0$ are pixels such that the ADRC result is "1" when the pixel value $X_0$ is 0. When the threshold value $(X_0+\max)/2$ becomes equal to that pixel value, the result of the ADRC process changes from "1" to "0".

Therefore, if the pixel value of a pixel #i is denoted as $X_i$ (i=1, 2, 3, 4), when the equation $X_i=(X_0+\max)/2$ holds, that is, when the pixel value $X_0$ becomes a value expressed by the equation $X_0=2X_i-\max$, the ADRC result of the pixel #i changes from "1" to "0", and as a result, the class of the class classification block changes. Since when a pixel value is equal to or greater than the threshold value $(X_0+\max)/2$ the ADRC result is set to "1", strictly speaking, the ADRC result remains at "1" when the equation $X_0=2X_i-\max$ holds, and the ADRC result becomes "0" when equation $X_0=2X_i-\max+1$ holds.

Meanwhile, since the case considered here where the pixel value $X_0$ changes in the range of $0 \leq X_0 < \min$, the threshold value $(X_0+\max)/2$ changes in the range of $\max/2$ to $(\max+\min)/2$ as shown in FIG. 16A. Therefore, as a result of the changing of the pixel value $X_0$, the pixel such that the ADRC result changes from "1" to "0" is a pixel #i whose pixel value $X_i$ satisfies the equation $\max/2 \leq X_i < (\max+\min)/2$. For example, as shown in FIG. 16A, when the pixel values $X_1$ to $X_4$ are distributed, as a result of the changing of the pixel value $X_0$, the ADRC results of the pixels #2 and #3 change, and as a result, the class of the class classification block changes. That is, in this case, the class change point $X_0$ is generated when $X_0$ satisfies each of the equations $X_0=2X_2-\max$ and $X_0=2X_3-\max$.

From the above, for the case in which the pixel value $X_0$ changes in the range of $0 \leq X_0 < \min$, a pixel #i is detected such that the pixel value $X_0$ satisfies the equation max/

$2 \leq X_i < (\max+\min)/2$, and the equation $X_0 = 2X_i - \max$ is calculated, making it possible to determine the class change point $X_0$ (pixel value $X_0$ as a class change point).

Figure 16B:
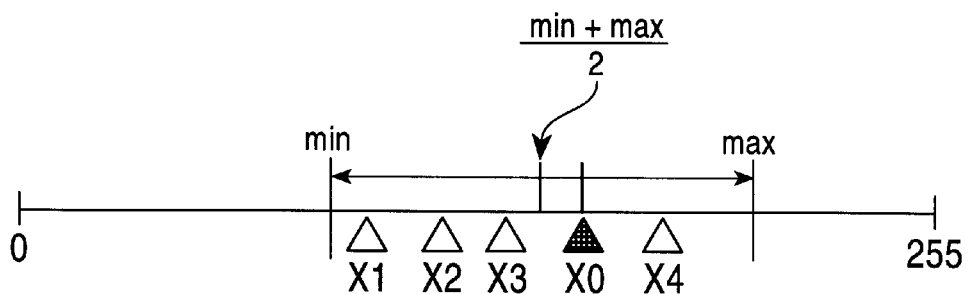

Next, when the pixel value $X_0$ changes in the range of $\min \leq X_0 < \max$, the change of the pixel value $X_0$ exerts an influence on the ADRC result of only the pixel #0. That is, when the pixel value $X_0$ changes in the range of $\min \leq X_0 < \max$, the threshold value for causing the ADRC result of the pixels #0 to #4 to be set to either 1 or 0 is fixed at $(\min+\max)/2$, as shown in FIG. 16B. Therefore, in this case, depending upon whether the pixel value $X_0$ is less than, equal to or greater than the threshold value $(\min+\max)/2$, the only possibility is that the ADRC result changes.

If it is assumed that the pixel value $X_0$ increases from min to max, the ADRC result becomes "0" of the pixel #0 when the pixel value $X_0$ is equal to min. Then, when the pixel value $X_0$ increases and the equation $X_0 = [(\min+\max)/2]$ holds, the ADRC result of the pixel #0 changes from "0" to "1" (where [ ] represents round-up). Since in the case of a pixel value being equal to or greater than the threshold value $(\min+\max)/2$ the ADRC result is set to "1", strictly speaking, the ADRC result remains at "0" when the equation $X_0 = [(\min+\max)/2] - 1$ holds, and the ADRC result becomes "1" when the equation $X_0 = [(\min+\max)/2]$ holds.

From the above, for the case in which the pixel value $X_0$ changes in the range of $\min \leq X_0 < \max$, the calculation of the equation $X_0 = [(\min+\max)/2]$ makes it possible to determine the class change point $X_0$.

Figure 16C:
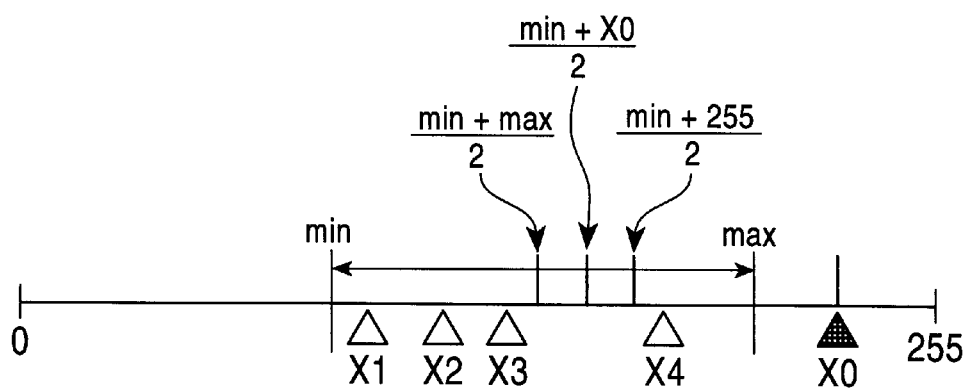

Next, in the case where the pixel value $X_0$ changes in the range of $\max \leq X_0 \leq 255$, the change of the pixel value $X_0$ exerts an influence on the dynamic range DR used to perform ADRC, that is, the threshold value $(\min+X_0)/2$ for causing the ADRC result of the pixels #0 to #4, shown in FIG. 16C, to be set to either 1 or 0.

If it is assumed that the pixel value $X_0$ increases from max to 255, in this case, since the threshold value $(\min+X_0)/2$ shown in FIG. 16C also increases, the ADRC result of the pixel #0 always remains at "1". Also, of the pixels #1 to #4, for the pixels where the ADRC result is "0" when the pixel value $X_0$ is a max, the ADRC result remains at "0".

More specifically, in this case, of the pixels #1 to #4, those pixels such that the ADRC result may change as a result of the changing of the pixel value $X_0$ are pixels such that the ADRC result is "1" when the pixel value $X_0$ is a max. When the threshold value $(\min+X_0)/2$ becomes equal to that pixel value, the result of the ADRC process changes from "1" to "0".

Therefore, if the pixel value of the pixel #i (where i=1, 2, 3, 4) is denoted as $X_i$, when the equation $X_i = (\min+X_0)/2$ holds, that is, when the pixel value $X_0$ becomes a value expressed by the equation $X_0 = 2X_i - \min$, the ADRC result of the pixel #i changes from "1" to "0", and as a result, the class of the class classification block changes. Since the ADRC results is set to "1" in the case of a pixel value being equal to or greater than the threshold value $(\min+X_0)/2$, strictly speaking, the ADRC result remains at "1" when the equation $X_0 = 2X_i - \min$ holds, and the ADRC result becomes "0" when the equation $X_0 = 2X_i - \min + 1$ holds.

Meanwhile, since a case is considered here in which the pixel value $X_0$ changes in the range of $\max \leq X_0 < 255$, the threshold value $(\min+X_0)/2$ changes in the range of $(\min+\max)/2$ to $(\min+255)/2$. Therefore, as a result of the changing of the pixel value $X_0$, the pixel such that the ADRC result changes from "1" to "0" is a pixel #i such that the pixel value $X_i$ satisfies the equation $(\min+\max)/2 \leq X_i < (\min+255)/2$. For example, as shown in FIG. 16C, when the pixel values $X_1$ to $X_4$ are distributed, there is no pixel present where the ADRC result changes as a result of the changing of the pixel value $X_0$. Therefore, the class of the class classification block does not change.

From the above, for the case in which the pixel value $X_0$ changes in the range of $\min \leq X_0 < 255$, a pixel #i is detected such that the pixel value $X_0$ satisfies the equation $(\min+\max)/2 \leq X_i < (\min+255)/2$, and the equation $X_0 = 2X_i - \min$ is calculated, making it possible to determine the class change point $X_0$.

Next, the case shown in FIG. 15B is considered in which the pixel value change of any pixel other than the class classification object pixel from among the pixels which form the class classification block changes. In this case, as shown in FIG. 15B, the pixel positioned in the upper left of the class classification block is denoted as pixel #0, and the pixels positioned in the upper portion, in the left, at the center, in the right, and in the lower portion thereof are denoted as pixels #1 to #5, respectively. Also, the pixel values of the pixels #0 to #5 are denoted as $X_0$ to $X_5$, respectively, and it is assumed that the pixel value $X_0$ changes. Furthermore, the maximum value or the minimum value of the pixel values of the eight pixels, excluding the pixel #0, of the nine pixels which form the class classification block, is denoted as max or min, respectively. Also, the pixel value is represented, for example, by eight bits, and therefore, the maximum value or the minimum value is 255 or 0, respectively.

Initially, when the pixel value $X_0$ changes in the range of $0 \leq X_0 < \min$, the change of the pixel value $X_0$ exerts an influence on the dynamic range DR used to perform ADRC in the same way as in the case of FIG. 16A. That is, in this case, the change of the pixel value $X_0$ exerts an influence on a threshold value $(X_0+\max)$, shown in FIG. 17A, for causing the ADRC result of the pixels #1 to #5 to be set to either 1 or 0. Since, here, the pixel #0 is not a class classification object pixel, the ADRC process result need not be considered.

Therefore, the pixels to be considered are only changed from the pixels #0 to #4 shown in FIG. 15A to the pixels #1 to #5 shown in FIG. 15B, and the concept is the same as in the case of FIG. 16A. Therefore, by detecting the pixel #i whose pixel value $X_i$ satisfies the equation $\max/2 \leq X_i < (\max+\min)/2$ and calculating the equation $X_0 = 2X_i - \max$, the class change point $X_0$ can be determined (where i=1, 2, 3, 4, and 5).

Figure 17A:
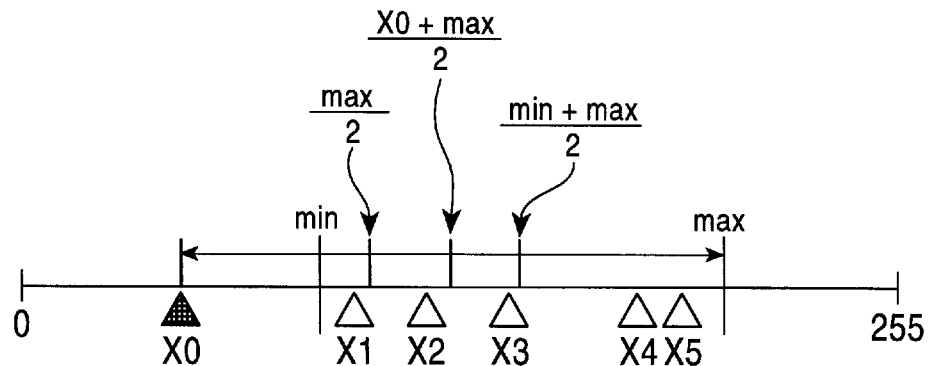
FIGS. 17A, 17B, and 17C are views illustrating a method for computing a class change point.

For example, as shown in FIG. 17A, in the case where the pixel values $X_1$ to $X_5$ are distributed, as a result of the changing of the $X_0$, the ADRC results of the pixels #2 and #1 change, causing the class of the class classification block to be changed. That is, in this case, the class change point $X_0$ is generated when $X_0$ satisfies each of the equations $X_0 = 2X_2 - \max$ and $X_0 = 2X_3 - \max$.

Figure 17B:
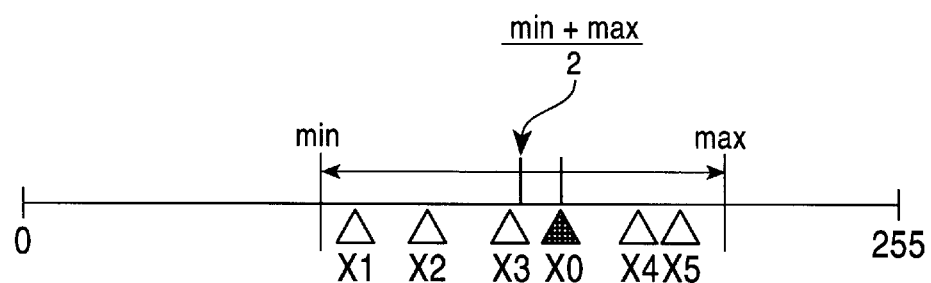

Next, in the case where the pixel value $X_0$ changes in the range of $\min \leq X_0 < \max$, the threshold value for causing the ADRC result of the pixels #1 to #5 to be set to either 1 or 0 remains at $(\min+\max)/2$, as shown in FIG. 17B. Furthermore, since the pixel #0 is not a class classification object pixel, the change of the pixel value $X_0$ does not exert an influence on the class of the class classification block. That is, in this case, a class change point is not present.

Next, in the case where the pixel value $X_0$ changes in the range of $\max \leq X_0 \leq 255$, the change of the pixel value $X_0$ exerts an influence on the dynamic range DR used to perform ADRC in the same manner as in the case of FIG. 16C. That is, in this case, the change of the pixel value $X_0$ exerts an influence on the threshold value $(\min+X_0)/2$, shown in FIG. 17C, for causing the ADRC result of the pixels #1 to #5 to be set to either 1 or 0. Since, in this case, the pixel #0 is not a class classification object pixel, the ADRC result need not be considered.

Therefore, the pixels to be considered are only changed from the pixels #0 to #4 shown in FIG. 15A to the pixels #1 to #5 shown in FIG. 15B, and the concept is the same as in the case of FIG. 16C. Therefore, by detecting the pixel #i such that the pixel value $X_i$ satisfies the equation $(min+max)/2 \leq X_i < (min+255)/2$ and calculating the equation $X_0 = 2X_i - min$, the class change point $X_0$ can be determined (where i=1, 2, 3, 4, and 5).

Figure 17C:
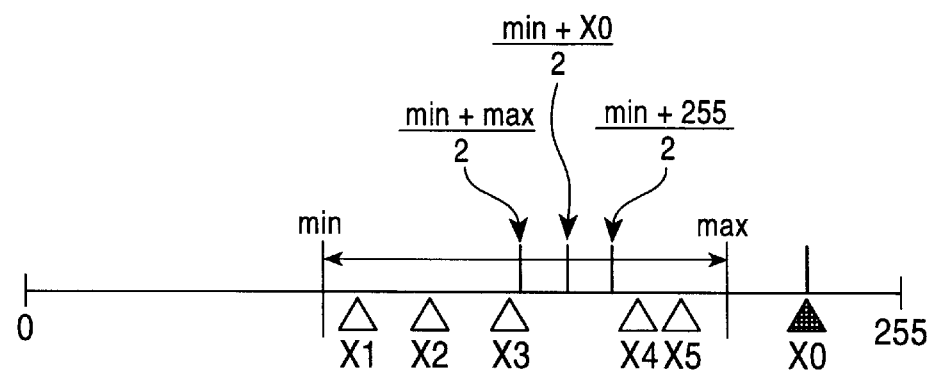

For example, as shown in FIG. 17C, in the case where the pixel values $X_1$ to $X_5$ are distributed, a pixel such that the ADRC result changes as a result of the changing of the $X_0$ is not present, and therefore, the class of the class classification block does not change. That is, a class change point is not present.

The class change point can also be computed by changing the pixel to be adjusted from 0 to 255 in order to perform class classification of the class classification block including the pixel to be adjusted rather than the computation being performed by distinguishing cases such as those described above. However, the number of processing steps required is generally less for a case in which different cases are used.

Figure 18:
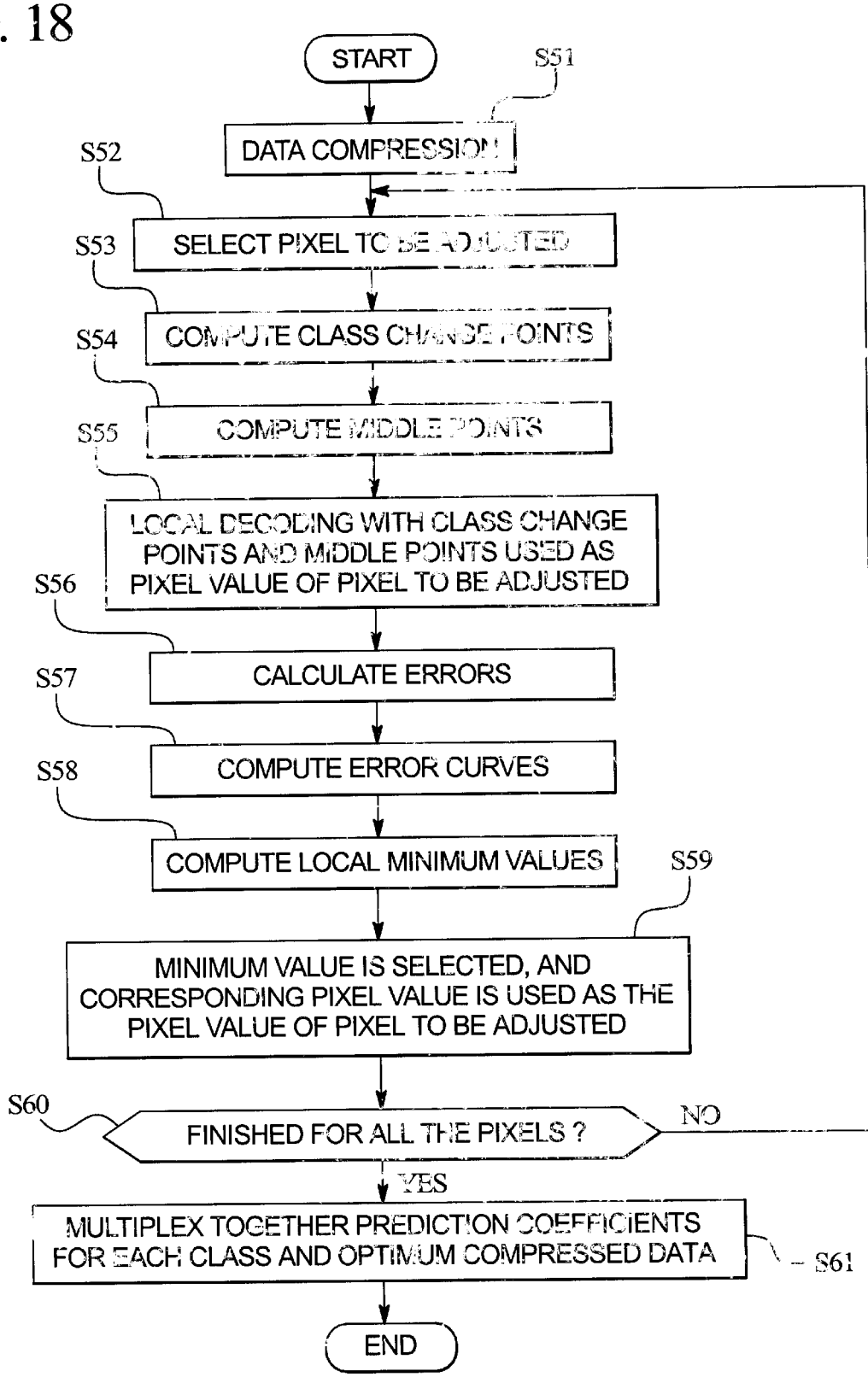
FIG. 18 is a flowchart illustrating the operation of the transmission apparatus 1 of FIG. 2 in a case in which an error curve is estimated from a class change point in order to determine minimum error information.

Next, referring to the flowchart of FIG. 18, a description will be given of the operation of the transmission apparatus 1 of FIG. 3 in a case in which a class change point is computed, an error curve is estimated, and the optimum pixel value of the pixel to be adjusted is determined.

More specifically, initially, in step S51, in the same way as in the case of step S31 of FIG. 10, compressed data is produced by the compression section 21, and the process proceeds to step S52. In step S52, one of the compressed data (one pixel) is selected as a pixel to be adjusted in the compression section 21, and the process proceeds to step S53 where the pixel value X of the pixel to be adjusted is calculated when the class of the class classification block (for example, where nine class classification blocks where class classification blocks are formed as described with reference to FIG. 13) including the pixel to be adjusted changes, that is, the class change point.

Then, the process proceeds to step S54 where the middle point between adjacent class change points is determined in the compression section 21. That is, in addition to all the class change points for the nine class classification blocks obtained in step S53, the compression section 21 assumes the minimum value and the maximum value (for example, 0 and 255 when the pixel value is represented for example, by eight bits as described above) of the pixel values that the pixels can take as class change points, and arranges those class classification blocks, for example, in an ascending order (or descending order). Furthermore, assuming two adjacent class change points in particular as noncontinuous points of the two ends of one error curve, the compression section 21 determines a middle point which is a midpoint of the two class change points. Then, the compression section 21 makes a set with the two class change points which are noncontinuous points of the two ends of one error curve and the middle point determined therefrom, and outputs them, together with the other compressed data, to the local decoding section 22.

In step S55, in the local decoding section 22, assuming each of the two class change points supplied from the compression section 21 and the middle point which is a set therewith as the pixel values of the pixels to be adjusted, local decoding is performed by using the other compressed data supplied from the compression section 21, and the prediction values are determined. That is, three kinds of prediction values are determined in a case in which the pixel values of the pixels to be adjusted are to be each of the two class change points and the middle point. These three kinds of prediction values are supplied to the error computation section 23 where three pieces of error information for the three kinds of prediction values are computed in step S56.

These three pieces of error information are supplied as a control signal to the compression section 21 through the determination section 24. When the compression section 21 receives the three pieces of error information such that the pixel values of the pixels to be adjusted are to be each of the two class change points and the middle point, the process proceeds to step S57 where an error curve, which is a second-order curve passing through the three points corresponding to the two class change points and the middle point is computed on the basis of the three points and the error information for each of them, as described with reference to FIG. 12.

The processing of steps S54 to S57 is performed on all of the adjacent two class change points, and as a result, all error curves which form curves expressing the relationship between the noncontinuous pixel values and the error information are determined.

Thereafter, the process proceeds to step S58 where a local minimum value of each error curve is determined in the compression section 21, and the process proceeds to step S59. Next, in step S59, in the compression section 21, the smallest of the local minimum values of the error curves is determined. That is, the minimum error information obtained when the pixel values of the pixels to be adjusted are changed from the minimum value to the maximum value is determined. Furthermore, in step S59, the pixel value (hereinafter, as required, referred to as an optimum pixel value) of the pixel to be adjusted when the minimum error information is obtained is determined from the error curve, and the optimum pixel value is set to that pixel value. Hereinafter, the optimum pixel value set in step S59 is used as the pixel value of the pixel to be adjusted at that time until the coding of an image for one frame (or field), which is to be presently coded, is terminated.

After a particular pixel is used as a pixel to be adjusted and the optimum pixel value of the pixel is determined, the process proceeds to step S60 where it is determined whether or not the processing of steps S52 to S59 has been performed by using all the pixels (compressed data) which form the compressed image as the pixels to be adjusted in the compression section 21. When it is determined in step S60 that the processing has not yet been performed using all the compressed data as the pixels to be adjusted, the process returns to step S52 where a pixel (compressed data) which has not yet been used as a pixel to be adjusted is selected as a pixel to be adjusted, and processing of step S53 and subsequent steps is repeated.

Also, when it is determined in step S60 that the processing has been performed by using all the compressed data as the pixels to be adjusted, that is, when the optimum pixel values are obtained for all the compressed data, the compression section 21 outputs all of the optimum pixel values (since the optimum pixel values can be considered such that the compressed data is adjusted, these can be referred to as adjusted data) to the determination section 24 and also supplies them to the local decoding section 22. The local decoding section 22 performs local decoding by using the optimum pixel values from the compression section 21 and outputs the resultant prediction coefficients for each class to the determination section 24. The determination section 24 uses the optimum pixel values supplied from the compression section 21 in the above-described way as optimum compressed data, and outputs them, together with the prediction coefficients for each class supplied from the local decoding section 22, to the multiplexing section 25. Then, in step S61, the multiplexing section 25 multiplexes together the optimum compressed data and the prediction coefficients for each class from the determination section 24, and outputs the resultant coded data, thus terminating the processing.

In the manner described above, by determining the class change points and estimating an error curve, a pixel value which minimizes the error information can be determined more quickly and efficiently than in a case in which a full search process is performed. Furthermore, it is possible for the receiving apparatus 4 to obtain a decoded image with better image quality.

In this case, when the main consideration is to obtain the optimum compressed data, the transmission apparatus 1 of FIG. 3 can be regarded as a coding apparatus which performs coding of an image for obtaining such optimum compressed data. Also, when the main consideration is to obtain the optimum prediction coefficients for each class for obtaining a decoded image from the optimum compressed data, the transmission apparatus 1 can be regarded as a learning apparatus which performs learning for obtaining such an optimum prediction coefficients for each class.

Figure 19:
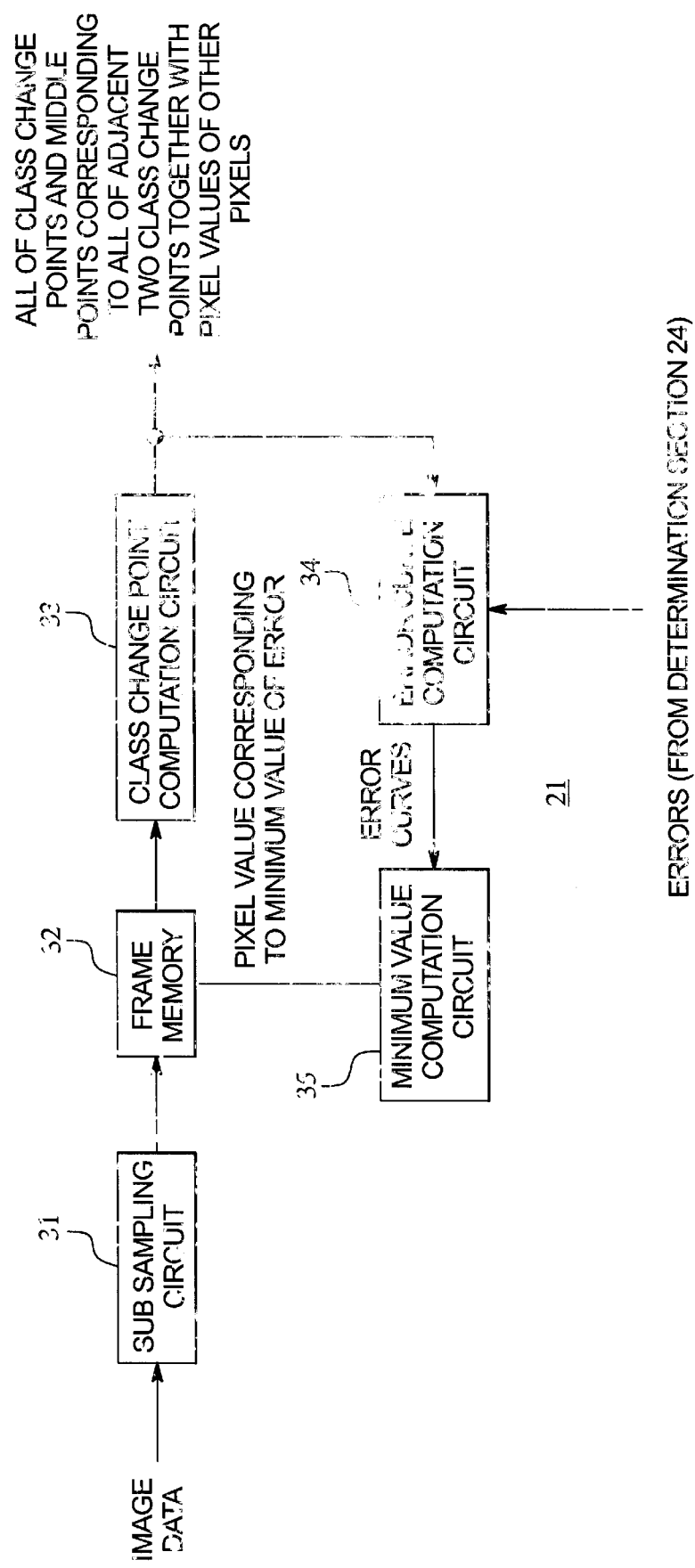
FIG. 19 is a block diagram showing an example of the construction of a compression section 21 in FIG. 3 when processing of FIG. 18 is performed.

FIG. 19 shows an example of the construction of the compression section 21 in a case in which the transmission apparatus 1 of FIG. 3 performs the processing described with reference to FIG. 18.

The image to be coded is supplied to the subsampling circuit 31 whereby it is formed into compressed data (compressed image) in a manner described with reference to FIG. 5. This compressed data is supplied to a frame memory 32 and stored therein. In the frame memory 32, compressed data for one frame (or field) from the subsampling circuit 31 is stored until the coding of the compressed data is terminated.

When the compressed data from the subsampling circuit 31 is stored in the frame memory 32, the class change point computation circuit 33 selects one of the compressed data as a pixel to be adjusted and computes class change points in the manner described above. Furthermore, the class change point computation circuit 33 also computes middle points after the computation of the class change points and applies all of the class change points and the middle point corresponding to all of the adjacent two class change points, together with the pixel values of the other pixels stored in the frame memory 32, to the local decoding section 22.

In the local decoding section 22, as described with reference to FIG. 18, using each of the two class change points supplied from the compression section 21 (class change point computation circuit 33) and the middle point for each of all of the adjacent two class change points which is a set as the pixel values of the pixels to be adjusted, local decoding is performed by also using the pixel values of the other pixels supplied from the compression section 21 (class change point computation circuit 33), thereby determining prediction values in a case in which the pixel values of the pixels to be adjusted are to be all of the class change points and the middle points. All of these prediction values are supplied to the error computation section 23 whereby error information with respect to all of the prediction values are computed. All of the error information is supplied as a control signal to the error curve computation circuit 34 through the determination section 24.

Furthermore, all of the class change points and the corresponding middle points supplied from the class change point computation circuit 33 to the local decoding section 22 are also supplied to the error curve computation circuit 34. Then, the error curve computation circuit 34 uses the two class change points and the middle point for each of all of the adjacent two class change points from the class change point computation circuit 33 and the error information, corresponding to each of them, from the determination section 24 and computes error curves which is are second-order curves passing through each of the three points corresponding.

The class change point computation circuit 33 and the error curve computation circuit 34 perform similar processing for all of the adjacent two class change points obtained for the pixels to be adjusted, thereby determining all the error curves which form the curves expressing the relationship between the pixel values of the pixels to be adjusted and the error information.

All of these error curves are supplied from the error curve computation circuit 34 to the minimum value computation circuit 35. In the minimum value computation circuit 35, a local minimum value of each of all the error curves for the pixels to be adjusted is determined, and further, the smallest of the local minimum values is selected, making it possible to obtain the minimum error information obtained when the pixel value of the pixel to be adjusted is changed from a minimum value to a maximum value. Then, in the minimum value computation circuit 35, the pixel value of the pixel to be adjusted when the minimum error information is obtained, that is, the optimum pixel value, is determined, and the pixel value which has been stored until now is replaced with the optimum pixel value and written into the frame memory 32 as the pixel value of the pixel to be adjusted.

Hereafter, similar processing is repeated by using pixels which have not yet been adjusted from among the pixels which are stored in the frame memory 32 as new pixels to be adjusted.

Then, processing is performed by using all the pixels stored in the frame memory 32 as the pixels to be adjusted. As a result, when a state is reached in which only the optimum pixel values are stored in the frame memory 32, the class change point computation circuit 33 supplies all the optimum pixel values (the pixel values for one frame (or one field)) stored in the frame memory 32 to the local decoding section 22 whereby the prediction coefficients for each class are determined and all the optimum pixel values are supplied as the optimum compressed data to the determination section 24. Thereafter, in the compression section 21, similar processing is repeated on the image for the next frame (or field).

Figure 20:
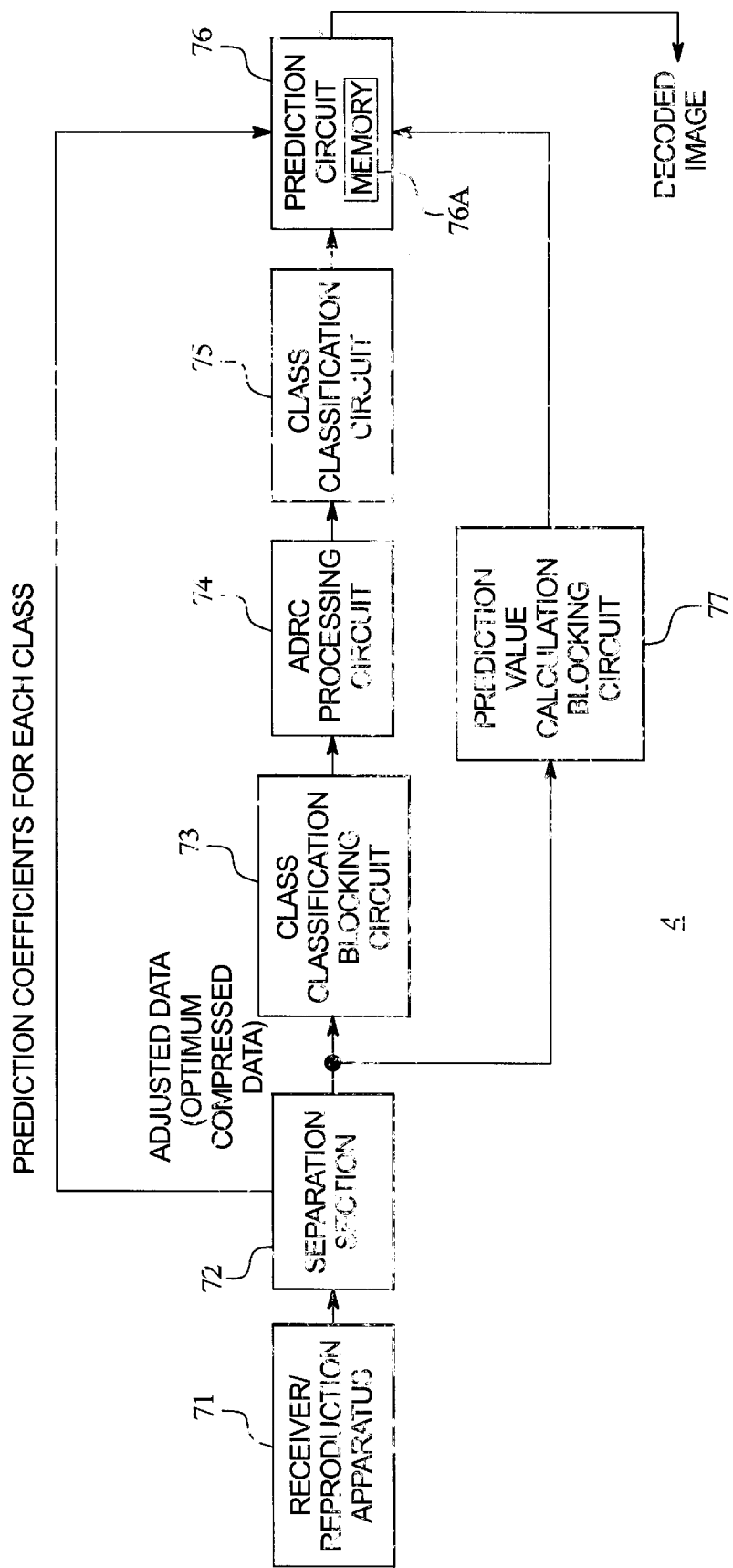
FIG. 20 is a block diagram showing a first example of the construction of a receiving apparatus 4 of FIG. 1.

FIG. 20 shows an example of the construction of the receiving apparatus 4 of FIG. 1.

In a receiver/reproduction apparatus 71, coded data recorded on the recording medium 2 is reproduced, or coded data transmitted through the transmission line 3 is received, and is supplied to a separation section 72. In the separation section 72, adjusted data (optimum compressed data) and the prediction coefficients for each class are extracted from the coded data. The adjusted data is supplied to a class classification blocking circuit 73 and a prediction value calculation blocking circuit 77, and the prediction coefficients for each class are supplied to the prediction circuit 76 whereby the prediction coefficients for each class are stored in a memory 76A which is contained in the prediction circuit 76.

The class classification blocking circuit 73, the ADRC processing circuit 74, a class classification circuit 75, or the prediction value calculation blocking circuit 77 are constructed the same as the class classification blocking circuit 41, the ADRC processing circuit 44, the class classification circuit 45, or the prediction value calculation blocking circuit 42, shown in FIG. 6. Therefore, in these blocks, processing similar to that in FIG. 6 is performed, such that a prediction value calculation block is output from the prediction value calculation blocking circuit 77, and class information is output from the class classification circuit 75. The prediction value calculation block and the class information are supplied to the prediction circuit 76. The class classification circuit 75 uses five pixels, as shown in FIG. 13, as the class classification object pixels to determine the class information in case of corresponding to the embodiment as shown in FIG. 12 through FIG. 19.

The prediction circuit 76 reads from the memory 76 A prediction coefficients of 25×9 corresponding to the class information supplied from the class classification circuit 75, computes the prediction values of the 3×3 pixels of the original image on the basis of equation (1) by using the 25×9 prediction coefficients and the adjusted data which form the prediction value calculation block of 5×5 pixels supplied from the prediction value calculation blocking circuit 77, and an image formed of such prediction values is output as a decoded image, for example, in one frame (or one field) unit. This decoded image becomes almost the same image as the original image, as described above.

On the receiving side, even if a receiving apparatus 4 such as that shown in FIG. 20 is not used, it is possible for an apparatus which decodes a subsampled image by simple interpolation to obtain a decoded image by performing conventional interpolation without using prediction coefficients for each class generated by the above described embodiment. However, the decoded image obtained in this case has deteriorated image quality (resolution).

Although, in the above-described case, prediction coefficients for each class are determined and prediction values are computed using these prediction coefficients for each class in the local decoding section 22 of FIG. 3, it is possible for the local decoding section 22 to compute prediction values without determining prediction coefficients for each class (by using prediction coefficients for each class determined by learning in advance).

Figure 21:
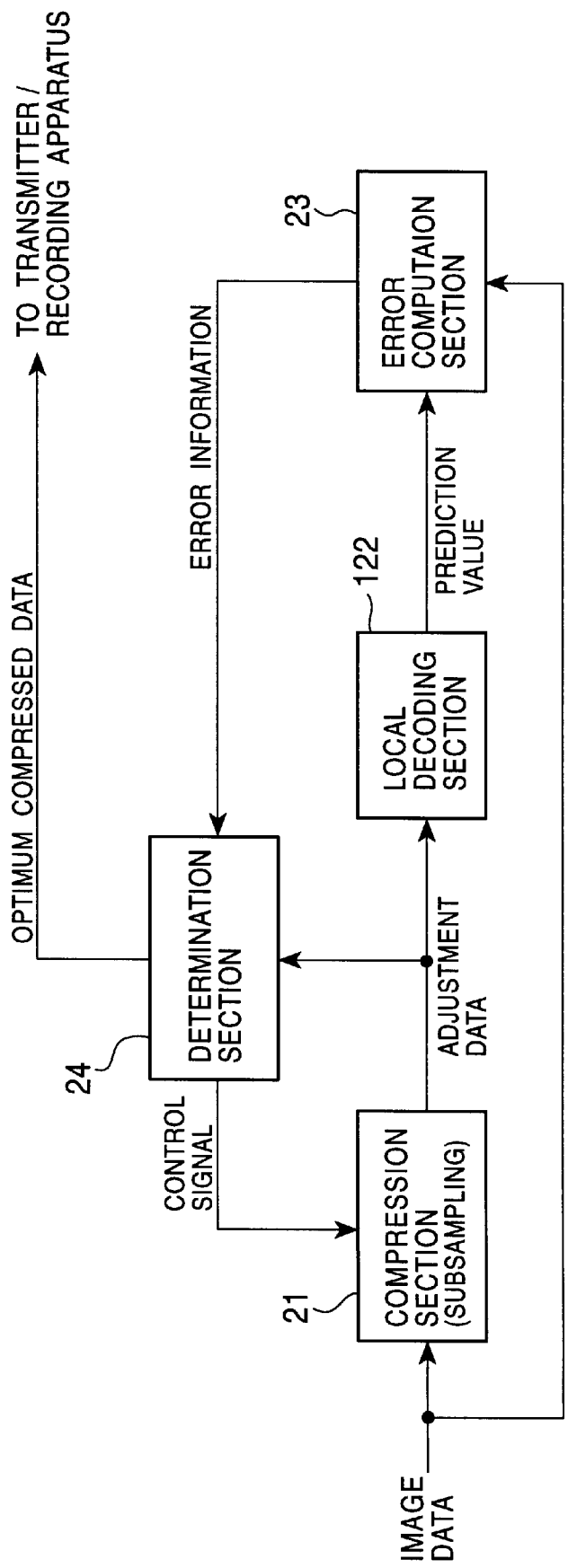
FIG. 21 is a block diagram showing a second embodiment of the functional construction of the transmission apparatus 1 of FIG. 1 excluding a transmitter/recording apparatus of FIG. 2.

That is, FIG. 21 shows a second example of the functional construction of the transmission apparatus 1 of FIG. 1 excluding a transmitter/recording apparatus of FIG. 2. Components in FIG. 21 which correspond to those in FIG. 3 are given the same reference numerals. That is, this transmission apparatus 1 is constructed basically the same as that in FIG. 3 except that a local decoding section 122 is provided in place of the local decoding section 22.

In FIG. 3, the prediction coefficients for each class are supplied from the local decoding section 22 to the determination section 24, whereas in FIG. 21 the prediction coefficients for each class are not supplied from the local decoding section 122 to the determination section 24.

Although, in FIG. 3, original image data is supplied to the local decoding section 22, in FIG. 21, original image data is not supplied to the local decoding section 122.

Figure 22:
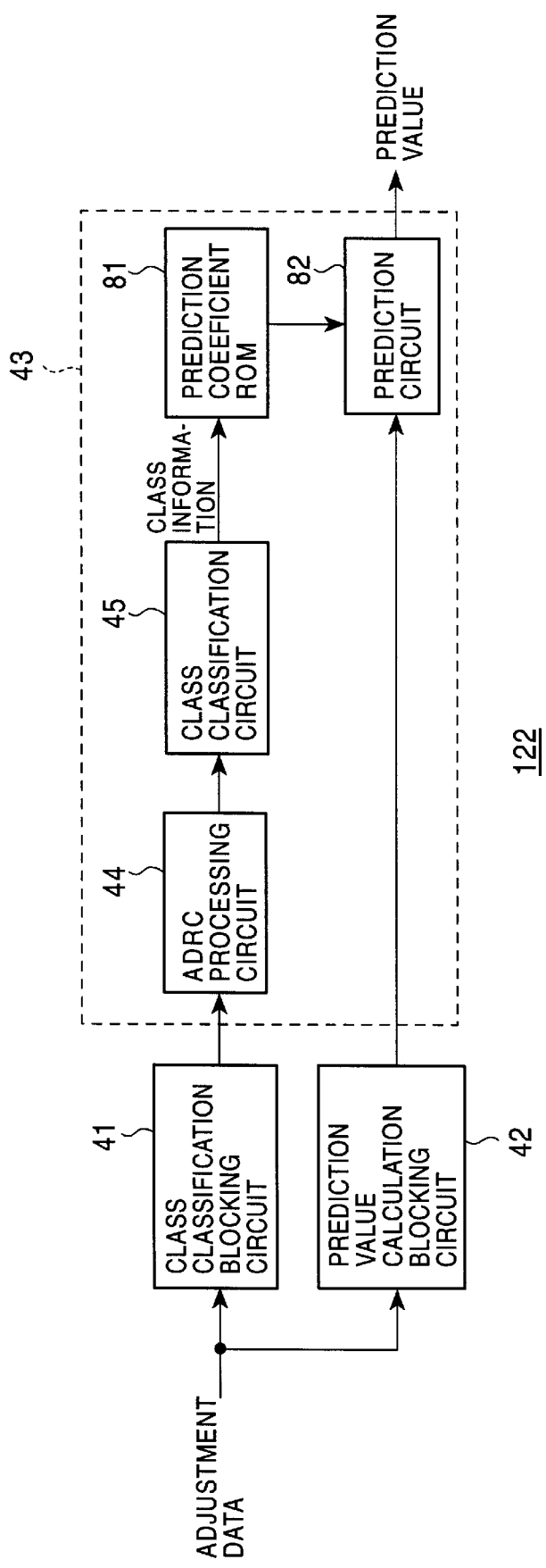
FIG. 22 is a block diagram showing an embodiment of a local decoding section 122 of FIG. 21.

FIG. 22 shows an example of the construction of the local decoding section 122 of FIG. 21. Components in FIG. 22 which correspond to those in FIG. 6 are given the same reference numerals. That is, the local decoding section 122 is constructed the same as the local decoding section 22 in FIG. 6 except that prediction coefficients ROM 81 and a prediction circuit 82 are provided in place of the adaptive processing circuit 46.

The prediction coefficients ROM 81, which has stored therein prediction coefficients for each class determined by performing learning (to be described later) in advance, receives class information output from the class classification circuit 44, reads prediction coefficients stored at an address corresponding to the class information and supplies them to the prediction circuit 82.

In the prediction circuit 82, a linear first-order equation shown in equation (1) (specifically, for example, equation (8)) is calculated by using a prediction value calculation block of 5×5 pixels from the prediction value calculation blocking circuit 42 and 25×9 prediction coefficients from the prediction coefficients ROM 81, thereby computing the prediction value of 3×3 pixels of the original image.

Therefore, according to the class classification adaptive processing circuit 43 of FIG. 22, the prediction values are computed without using the original image. For this reason, as described above, the original image is not supplied to the local decoding section 122.

Next, the operation thereof is described.

In the local decoding section 122, processing similar to each of those in FIG. 6 is performed, in the class classification blocking circuit 41, the prediction value calculation blocking circuit 42, the ADRC processing circuit 44, and the class classification circuit 45, thereby class information is output from the class classification circuit 45 in the same way as the above-described embodiments. This class information is supplied to the prediction coefficients ROM 81.

In the prediction coefficients ROM 81, when the class information is received, 25×9 prediction coefficients corresponding to the class information are read from among the stored prediction coefficients for each class and are supplied to the prediction circuit 82.

Not only 25×9 prediction coefficients are supplied from the prediction coefficients ROM 81 to the prediction circuit 82, but also a prediction value calculation block of 5×5 pixels is supplied from the prediction value calculation blocking circuit 42 to the prediction circuit 82. Then, in the prediction circuit 82, as a result of the performance of adaptive processing by using the 25×9 prediction coefficients from the prediction coefficients ROM 81 and the prediction value block of 5×5 pixels from the prediction value calculation blocking circuit 42, that is, specifically, as a result of the performance of the computation based on equation (1) (or equation (8)), the prediction value of the 3×3 pixels of the original image, in which the subject adjusted data (the pixel at the center of the prediction value calculation block) is at the center, is determined.

Thereafter, when prediction values for one frame (or field) are determined, the prediction values of the original image data are supplied to the error computation section 23.

Therefore, in the embodiment of FIG. 21, prediction coefficients for each class are not supplied from the local decoding section 122 to the determination section 24, and as a result, the optimum compressed data is output as coded data to the transmitter/recording apparatus 16 (FIG. 1).

Figure 23:
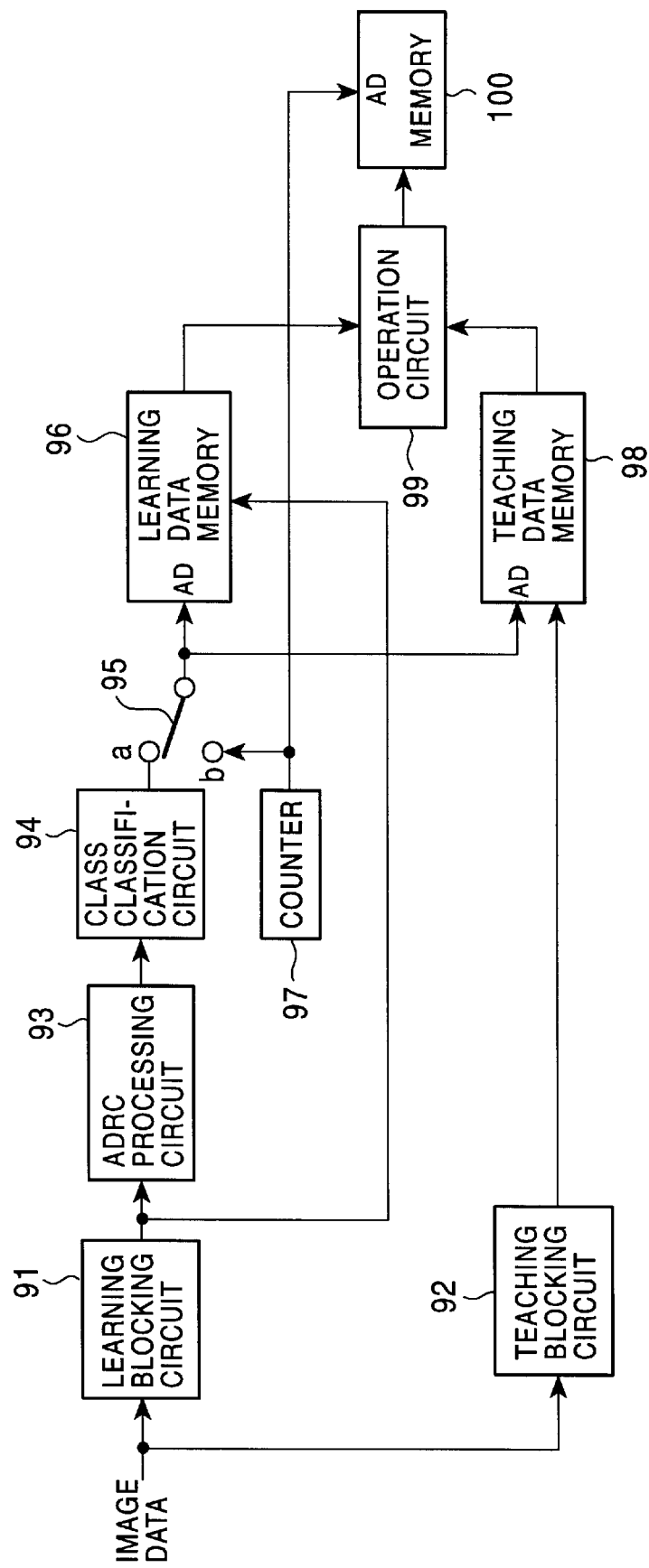
FIG. 23 is a block diagram showing the embodiment of the image processing apparatus for computing a prediction coefficient stored in a prediction coefficient ROM 81 of FIG. 22.

FIG. 23 shows an example of the construction of the image processing apparatus which performs learning for obtaining prediction coefficients for each class stored in the prediction coefficients ROM 81 of FIG. 22.

Image data for learning (image for learning) for obtaining prediction coefficients for each class which are applicable to any image is supplied to a learning blocking circuit 91 and a teaching blocking circuit 92.

The learning blocking circuit 91 extracts 25 pixels (5×5 pixels) in positional relationship, for example, indicated by the ● marks in FIG. 5 from the input image data and supplies the block composed of these 25 pixels as a learning block to an ADRC processing circuit 93 and a learning data memory 96.

Also, the teaching blocking circuit 92 produces blocks, for example, composed of nine pixels of 3×3 from the input image data and supplies these blocks composed of nine pixels as teaching blocks to a teaching data memory 98.

When in the learning blocking circuit 91 a learning block composed of 25 pixels in positional relationship, for example, indicated by the ● marks in FIG. 5 is produced, in the teaching blocking circuit 92, a teaching block composed of 3×3 pixels, which is indicated by a surrounding rectangle in FIG. 5, is produced.

The ADRC processing circuit 93 extracts, for example, the center nine pixels (3×3 pixels) of the 25 pixels which form the learning block and performs a one-bit ADRC process on this block composed of nine pixels in the same way as in the ADRC processing circuit 44 of FIG. 22. The block of 3×3 pixels on which the ADRC process has been performed is supplied to a class classification circuit 94. In the class classification circuit 94, in the same way as in the class classification circuit 45 of FIG. 22, a block from the ADRC processing circuit 93 is subjected to a class classification process, and the class information obtained thereby is supplied to the learning data memory 96 and the teaching data memory 98 through a terminal "a" of a switch 95.

In the learning data memory 96 or the teaching data memory 98, a learning block from the learning blocking circuit 91 or a teaching block from the teaching blocking circuit 92 is stored therein, respectively, at an address corresponding to the class information supplied to the memory.

Therefore, if, in the learning data memory 96, a block, for example, composed of 5×5 pixels indicated by the ● marks in FIG. 5 is stored as a learning block at a particular address, in the teaching data memory 98, a block of 3×3 pixels indicated by a surrounding rectangle in FIG. 5 is stored as a teaching block at the same address as that address.

Thereafter, similar processing is repeated for all images for learning prepared in advance. As a result, the learning block and the teaching block, which is composed of nine pixels such that the prediction value is determined by using a prediction value calculation block composed of 25 adjusted data having the same positional relationship as the 25 pixels which form the learning block, are stored in the learning data memory 96 and the teaching data memory 98 at the same address, respectively.

In the learning data memory 96 and the teaching data memory 98, a plurality of information can be stored at the same address, making it possible to store a plurality of learning blocks and a plurality of teaching blocks at the same address.

When the learning blocks and the teaching blocks for all the images for learning are stored in the learning data memory 96 and the teaching data memory 98, the switch 95 having selected the terminal "a" is switched to a terminal "b", whereby the output of a counter 97 is supplied as an address to the learning data memory 96 and the teaching data memory 98. The counter 97 counts a predetermined clock and outputs the count value. In the learning data memory 96 or the teaching data memory 98, a learning block or a teaching block stored at the address corresponding to the count value is read, and is supplied to an operation circuit 99.

Therefore, a set of learning blocks and a set of teaching blocks, at a class corresponding to the count value of the counter 97, are supplied to the operation circuit 99.

When the operation circuit 99 receives a set of learning blocks and a set of teaching blocks, with respect to a particular class, the operation circuit 99 computes prediction coefficients which minimizes the error by a method of least squares by using the sets of the blocks.

More specifically, if, for example, the pixel values of the pixels which form the class classification block are denoted as $x_1, x_2, x_3, \ldots$, and prediction coefficients to be determined are denoted as $w_1, w_2, w_3, \ldots$, in order to determine the pixel value y of a particular pixel which forms the teaching block by the linear first-order combination of these, the prediction coefficients $w_1, w_2, w_3, \ldots$ must satisfy the following equation:

$$y = w_1 x_1 + w_2 x_2 + w_3 x_3 + \ldots$$

Therefore, in the operation circuit 99, the prediction coefficients $w_1, w_2, w_3, \ldots$ which minimize the error of the squares of the prediction values $w_1 x_1 + w_2 x_2 + w_3 x_3 + \ldots$ with respect to a truth value y are determined by formulating a normalized equation shown in the above-described equation (7) and solving it from the learning blocks of the same class and the corresponding teaching block. Therefore, by performing this process for each class, 25×9 prediction coefficients are produced for each class.

The prediction coefficients for each class, determined by the operation circuit 99, are supplied to a memory 100. In addition to the prediction coefficients for each class from the operation circuit 99, the count value is supplied from the counter 97 to the memory 100, whereby in the memory 100, prediction coefficients from the operation circuit 99 are stored at an address corresponding to the count value from the counter 97.

In the manner described above, in the memory 100, 25×9 prediction coefficients most appropriate for predicting the 3×3 pixels of the block of a class are stored at the address corresponding to each class.

In the prediction coefficients ROM 81 of FIG. 22, the prediction coefficients for each class stored in the memory 100 in the manner described above are stored.

In addition to the above, it is also possible to store in the prediction coefficients ROM 81 of FIG. 22 (the same applies for a prediction coefficients ROM 101 of FIG. 24 to be described later) the prediction coefficients for each class supplied from the local decoding section 22 to the determination section 24, for example, by processing described with reference to FIG. 18.

Figure 24:
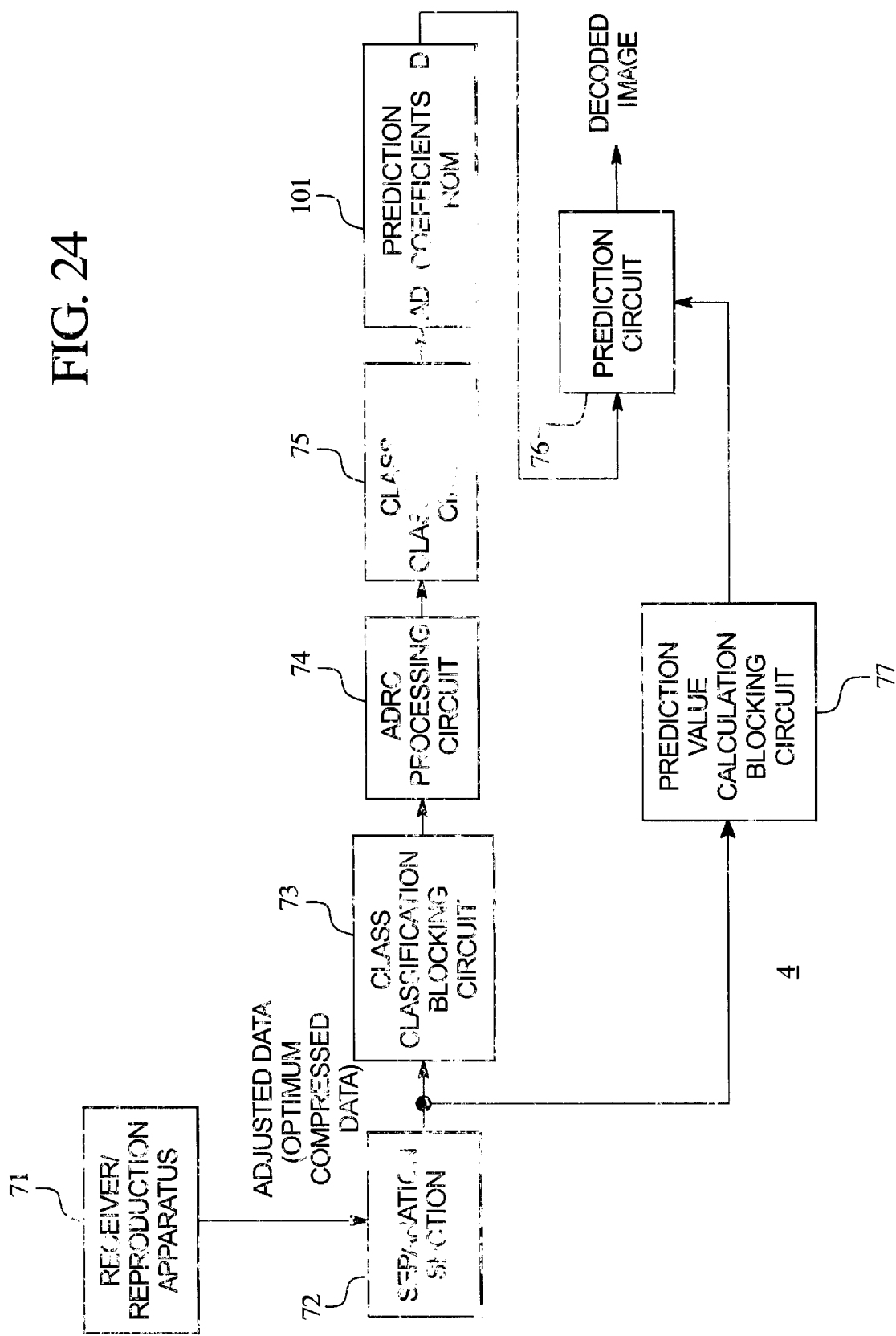
FIG. 24 is a block diagram showing a second embodiment of the receiving apparatus 4 of FIG. 1.

FIG. 24 shows an example of the construction of the receiving apparatus 4 in a case in which the transmission apparatus 1 is constructed as shown in FIG. 21. Components in FIG. 24 which correspond to those in FIG. 20 are given the same reference numerals. That is, the receiving apparatus 4 of FIG. 24 is constructed basically the same as that in FIG. 20 except that a prediction coefficients ROM 101 is newly provided between the class classification circuit 75 and the prediction circuit 76, and the prediction circuit 76 does not contain the memory 76A.

In the case where the transmission apparatus 1 is constructed as shown in FIG. 21, due to the foregoing, prediction coefficients for each class are not contained in the coded data output from the receiver/reproduction apparatus 71. For this reason, in the separation section 72, only the adjusted data (optimum compressed data) is extracted from the coded data and is supplied to the class classification blocking circuit 73 and the prediction value calculation blocking circuit 77.

In the class classification blocking circuit 73, the ADRC processing circuit 74, the class classification circuit 75 or the prediction value calculation blocking circuit 77, processing similar to that in the class classification blocking circuit 41, the ADRC processing circuit 44, the class classification circuit 45 or the prediction value calculation blocking circuit 42 in FIG. 22 is performed. As a result, a prediction value calculation block of 5×5 pixels is output from the prediction value calculation blocking circuit 77, and class information is output from the class classification circuit 75. The prediction value calculation block is supplied to the prediction circuit 76, and the class information is supplied to the prediction coefficients ROM 101.

In the prediction coefficients ROM 101, prediction coefficients which are the same as those for each class stored in the prediction coefficients ROM 81 of FIG. 22 are stored. When the class information is supplied from the class classification circuit 75, 25×9 prediction coefficients corresponding to the class information are read and are supplied to the prediction circuit 76.

The prediction circuit 76 computes the prediction values of 3×3 pixels of the original image on the basis of equation (1) by using the 25×9 prediction coefficients from the prediction coefficients ROM 101 and the adjusted data which form the prediction value calculation block of 5×5 pixels supplied from the prediction value calculation blocking circuit 77, and outputs an image for one frame (or field) composed of these prediction values as a decoded image.

In the case where the transmission apparatus 1 is constructed as shown in FIG. 21 and the receiving apparatus 4 is constructed as shown in FIG. 24, transmission or reception of 25×9 prediction coefficients is not required for each class, and it is possible to reduce the transmission capacity or the recording capacity by an amount corresponding to the non-performance of the transmission or reception.

It is possible to store in the prediction coefficients ROMs 81 and 101 the average value, etc., of the pixel values which form the teaching block for each class rather than storing the prediction coefficients for each class. In this case, when the class information is supplied, the pixel value corresponding to the class is output, and therefore, in the local decoding section 122 of FIG. 22, it is not required to provide the prediction value calculation blocking circuit 42 and the prediction circuit 82. Also, in the receiving apparatus 4 of FIG. 24, in a similar manner, it is not required to provide the prediction value calculation blocking circuit 77 and the prediction circuit 76.

In the foregoing, although the image processing apparatus of the present invention is described, such an image processing apparatus is particularly effective in a case in which, for example, not only a television signal of a standard method, such as the NTSC method, is coded, but a television signal of what is commonly called a high-vision method with a large amount of data is coded as well.

Although in this embodiment the sum of the squares of the error is used as error information, in addition to this, for example, the sum of the absolute value of the error or the sum of the error raised to the third or higher power may be used as the error information.

Although in this embodiment the relationship between the pixel values and the error information is expressed by a second-order curve, the present invention can be applied in a case in which the relationship between the pixel values and the error information is expressed by other than a second-order curve.

Although in this embodiment a block, such as a class classification block or a prediction value calculation block, is formed from an image for one frame (or field), in addition to this, the block may also be formed by using pixels (pixels of different frames), etc., at the same position in a plurality of frames which are continuous in a time sequence.

Although in this embodiment a regular equation is satisfied, for example, in one frame (or field) unit in order to determine prediction coefficients for each class, in addition to this, the process for computing prediction coefficients may also be performed by satisfying a regular equation, for example, in a plurality of frame (or field) units. The same applies for the other processing.

Although in this embodiment the CPU 14, which constitutes the transmission apparatus 1 of FIG. 2, executes an application program stored in the external storage device 15, which similarly constitutes the transmission apparatus 1, in order to perform various coding processing, such coding processing may also be performed by hardware. In a similar manner, the processing in the receiving apparatus 4 may be performed by causing a general computer to execute a program for performing such processing or by hardware.

In this embodiment, class change points are determined and further, an error curve is determined under the precondition that class classification is performed. However, since class change points are not present when class classification is not performed, that is, since the relationship between the pixel values and the error information does not become noncontinuous, as described above, it is possible to determine a curve expressing the relationship between the pixel values and the error information by using three arbitrary points.

According to the image coding apparatus and the image coding method according to the present invention, since an error curve expressing the relationship between compressed data and the prediction error can be estimated, it is possible to efficiently determine the compressed data which minimizes the error curve.

According to the recording medium, the image decoding apparatus, and the image decoding method according to the present invention, coded data is obtained by compressing an original image into compressed data by reducing the number of pixels of the original image, performing class classification based on the compressed data, estimating the original image in accordance with the resultant class, determining the prediction value, computing the prediction error of the prediction value with respect to the original image, estimating an error curve expressing the relationship between the compressed data and the prediction error, determining the compressed data which minimizes the error curve, and outputting the compressed data as the coded result of the original image. Therefore, it is possible to obtain a decoded image having high image quality.

According to the learning apparatus and the learning method according to the present invention prediction coefficients are determined for each class, and a prediction value is determined by linear combination of the prediction coefficients and compressed data. Furthermore, the prediction error of the prediction values with respect to the original image is computed, and an error curve expressing the relationship between the compressed data and the prediction error is estimated. Then, compressed data which minimizes the error curve is determined, and the prediction coefficients for each class determined from the compressed data is output. Therefore, it is possible to obtain prediction coefficients for each class capable of decoding the compressed data into a decoded image having high image quality.

What is claimed is:

1. Image encoding method for producing an optimum compressed data capable of producing a decoded image, comprising the steps of:

reducing a number of pixels of an original image and generating a compressed data;

performing a class classification to the compressed data and determining a class result corresponding to the compressed data;

generating prediction data of the original data in accordance with the class result;

generating prediction error information representing a difference between the prediction data and the original data;

estimating error curve information representing a relationship between the compressed data and the prediction error information; and determining an optimum compressed data in accordance with the error curve information.

2. The method according to the claim 1, further comprising the step of:

determining a number of class change points of the compressed data in which the class result is changed when performing the class classification;

wherein the estimating step estimates the error curve information based on prediction data corresponding to the number of class change points.

3. The method according to the claim 1, wherein the prediction data generating step comprising the steps of:

generating prediction coefficients for each class in accordance with the compressed data and the original data;

selecting prediction coefficients corresponding to the class result from the prediction coefficients for each class generated; and generating prediction data of the original data in accordance with prediction coefficients and the compressed data.

4. The method according to the claim 3, further comprising the steps of:

generating final prediction coefficients for each class in accordance with the optimum compressed data and the original data; and outputting the optimum compressed data and the final prediction coefficients for each class as a coded data.

5. The method according to the claim 1, wherein the prediction data generating step comprising the steps of:

reading out prediction coefficients corresponding to the class result from a memory which stores prediction coefficients for each class, the prediction coefficients for each class produced by learning in advance, using a number of training image; and generating prediction data of the original data in accordance with the read prediction coefficients and the compressed data.

6. An image encoding apparatus for producing an optimum compressed data capable of producing a decoded image, comprising:

means for reducing a number of pixels of an original image and generating a compressed data;

means for performing a class classification to the compressed data and determining a class result corresponding to the compressed data;

means for generating prediction data of the original data in accordance with the class result;

means for generating prediction error information representing a difference between the prediction data and the original data;

means for estimating error curve information representing a relationship between the compressed data and the prediction error information; and means for determining an optimum compressed data in accordance with the error curve information.

7. The apparatus according to the claim 9, further comprising:

means for determining a number of class change points of the compressed data in which the class result is changed when performing the class classification;

wherein the estimating means estimates the error curve information based on prediction data corresponding to the number of class change points.

8. The apparatus according to the claim 6, wherein the prediction data generating means comprising:

means for generating prediction coefficients for each class in accordance with the compressed data and the original data; and means for generating prediction data of the original data in accordance with the compressed data and prediction coefficients selected from prediction coefficients for each class generated in accordance with the class result.

9. The apparatus according to the claim 8, wherein the prediction coefficients generating means generates final prediction coefficients for each class in accordance with the optimum compressed data and the original data; and the apparatus further comprising:

means for outputting the optimum compressed data and the final prediction coefficients for each class as a coded data.

10. The apparatus according to the claim 6, wherein the prediction data generating means comprising:

memory in which prediction coefficients for each class are stored and outputting prediction coefficients corresponding to the class result therefrom, the prediction coefficients for each class produced by learning in advance, using a number of training image; and means for generating prediction data of the original data in accordance with the read prediction coefficients and the compressed data.

11. A record medium having an encoding program recorded thereon capable of instructing a decoding apparatus, the recording medium being prepared by the steps of:

reducing a number of pixels of an original image and generating a compressed data;

performing a class classification to the compressed data and determining a class result corresponding to the compressed data;

generating prediction data of the original data in accordance with the class result;

generating prediction error information representing a difference between the prediction data and the original data;

estimating error curve information representing a relationship between the compressed data and the prediction error information; and determining an optimum compressed data in accordance with the error curve information.

12. The record medium according to claim 11, the encoding program further comprising the step of:

determining a number of class change points of the compressed data in which the class result is changed when performing the class classification;

wherein the estimating step estimates the error curve information based on prediction data corresponding to the number of class change points.

13. The record medium according to claim 11, wherein the prediction data generating step comprising the steps of:
  generating prediction coefficients for each class in accordance with the compressed data and the original data;
  selecting prediction coefficients corresponding to the class result from the prediction coefficients for each class generated; and
  generating prediction data of the original data in accordance with prediction coefficients and the compressed data.

14. The record medium according to the claim 13, the encoding program further comprising the steps of:
  generating final prediction coefficients for each class in accordance with the optimum compressed data and the original data; and
  outputting the optimum compressed data and the final prediction coefficients for each class as a coded data.

15. The record medium according to the claim 11, wherein the prediction data generating step comprising the steps of:
  reading out prediction coefficients corresponding to the class result from a memory which stores prediction coefficients for each class, the prediction coefficients for each class produced by learning in advance, using a number of training image; and
  generating prediction data of the original data in accordance with the read prediction coefficients and the compressed data.

16. A record medium having an optimum compressed data capable of producing a decoded image almost same to a quality of an original image, the optimum compressed data stored in the recorded medium prepared by the steps of:
  reducing a number of pixels of an original image and generating a compressed data;
  performing a class classification to the compressed data and determining a class result corresponding to the compressed data;
  generating prediction data of the original data in accordance with the class result;
  generating prediction error information representing a difference between the prediction data and the original data;
  estimating error curve information representing a relationship between the compressed data and the prediction error information; and
  determining an optimum compressed data in accordance with the error curve information.

17. The record medium according to the claim 16, further comprising the step of:
  determining a number of class change points of the compressed data in which the class result is changed when performing the class classification;
  wherein the estimating step estimates the error curve information based on prediction data corresponding to the number of class change points.

18. The record medium according to the claim 16, wherein the prediction data generating step comprising the steps of:
  generating prediction coefficients for each class in accordance with the compressed data and the original data;
  selecting prediction coefficients corresponding to the class result from the prediction coefficients for each class generated; and
  generating prediction data of the original data in accordance with prediction coefficients and the compressed data.

19. The record medium according to the claim 18, the record medium further having final prediction coefficients for each class, the final prediction coefficients for each class stored in the recorded medium prepared by the further steps of:
  generating final prediction coefficients for each class in accordance with the optimum compressed data and the original data; and
  outputting the optimum compressed data and the final prediction coefficients for each class as a coded data.

20. The record medium according to the claim 16, wherein the prediction data generating step comprising the steps of:
  reading out prediction coefficients corresponding to the class result from a memory which stores prediction coefficients for each class, the prediction coefficients for each class produced by learning in advance, using a number of training image; and
  generating prediction data of the original data in accordance with the read prediction coefficients and the compressed data.

21. An image encoding apparatus for producing an optimum compressed data capable of producing a decoded image, comprising:
  a compression section that reduces a number of pixels of an original image to generate compressed data;
  a class classification circuit that performs class classification to the compressed data and determines a class result corresponding to the compressed data;
  a local decoding section that generates prediction data of the original data in accordance with the class result;
  an error computation section that generates prediction error information representing a difference between the prediction data and the original data;
  an estimation circuit that estimates error curve information representing a relationship between the compressed data and the prediction error information; and
  a determining circuit that determines an optimum compressed data in accordance with the error curve information.

22. The apparatus according to the claim 21, further comprising:
  a circuit that determines a number of class change points of the compressed data in which the class result is changed when performing the class classification;
  wherein the estimation circuit estimates the error curve information baled on prediction data corresponding to the number of class change points.

23. The apparatus according to the claim 21, wherein the error computation section comprising:
  a circuit that generates prediction coefficients for each class in accordance with the compressed data and the original data; and
  generating prediction data of the original data in accordance with the compressed data and prediction coefficients selected from prediction coefficients for each class generated in accordance with the class result.

24. The apparatus according to the claim 23, wherein
  the circuit that generates prediction coefficients generates final prediction coefficients for each class in accordance with the optimum compressed data and the original data; and the apparatus further comprising:
a mulitplexer that outputs the optimum compressed data and the final prediction coefficients for each class as a coded data.

25. The apparatus according to the claim 21, wherein the local decoding section comprising:
a memory in which prediction coefficients for each class are stored and outputting prediction coefficients corresponding to the class result therefrom, the prediction coefficients for each class produced by learning in advance, using a number of training image; and
a circuit that generates prediction data of the original data in accordance with the read prediction coefficients and the compressed data.

\* \* \* \* \*